US008218207B1

(12) United States Patent
Harrison, Jr.

(10) Patent No.: US 8,218,207 B1
(45) Date of Patent: Jul. 10, 2012

(54) POLYCHROMATIC ENCODING SYSTEM, METHOD AND DEVICE

(75) Inventor: Shelton E. Harrison, Jr., Culver City, CA (US)

(73) Assignee: Search and Social Media Partners LLC, Beverly Hills, CA (US)

( * ) Notice: Subject to any disclaimer, the term of this patent is extended or adjusted under 35 U.S.C. 154(b) by 0 days.

(21) Appl. No.: 12/658,727

(22) Filed: Feb. 16, 2010

Related U.S. Application Data

(63) Continuation of application No. 11/205,986, filed on Aug. 17, 2005, now Pat. No. 7,710,598.

(60) Provisional application No. 60/603,964, filed on Aug. 23, 2004.

(51) Int. Cl.
*G03F 3/08* (2006.01)

(52) U.S. Cl. .......... 358/518; 358/1.9; 358/2.1; 358/473; 358/1.15; 235/462.1; 235/462.04

(58) Field of Classification Search .................. 358/1.9, 358/2.1, 518, 473, 1.15; 235/462.1, 462.04
See application file for complete search history.

(56) References Cited

U.S. PATENT DOCUMENTS

| | | | | |
|---|---|---|---|---|
| 6,707,581 B1 * | 3/2004 | Browning | ...................... | 358/473 |
| 7,051,935 B2 * | 5/2006 | Sali et al. | .................. | 235/462.04 |
| 7,185,816 B1 * | 3/2007 | Shoobridge | .............. | 235/462.04 |
| 7,543,748 B2 * | 6/2009 | Kiliccote | .................... | 235/462.1 |
| 2002/0131071 A1 * | 9/2002 | Parry | ........................... | 358/1.15 |
| 2004/0065739 A1 * | 4/2004 | Xu et al. | ..................... | 235/462.1 |

* cited by examiner

*Primary Examiner* — Twyler Haskins
*Assistant Examiner* — Michael Burleson
(74) *Attorney, Agent, or Firm* — Beyer Law Group LLP

(57) ABSTRACT

Disclosed is a polychromatic barcode or portable data file symbology, image, system, method, and apparatus enabling virtually unlimited information density. In a preferred embodiment, ASCII characters are assigned to unique identifiers, which identifiers are in turn assigned to unique colors. Color blots are sequentially arranged in a symbol so as to match the sequence of corresponding identifiers to be encoded, and then the symbol is applied to a surface. To decode, the symbol is scanned, colors translated into identifiers, and identifiers translated into content. Also disclosed are blots dedicated to calibration. Information density is further enhanced through an external reference function achieved through commands included in the barcode itself, by which function infinitely high information density is achieved. Licensing information is available through www.inventerprise.com.

11 Claims, 29 Drawing Sheets

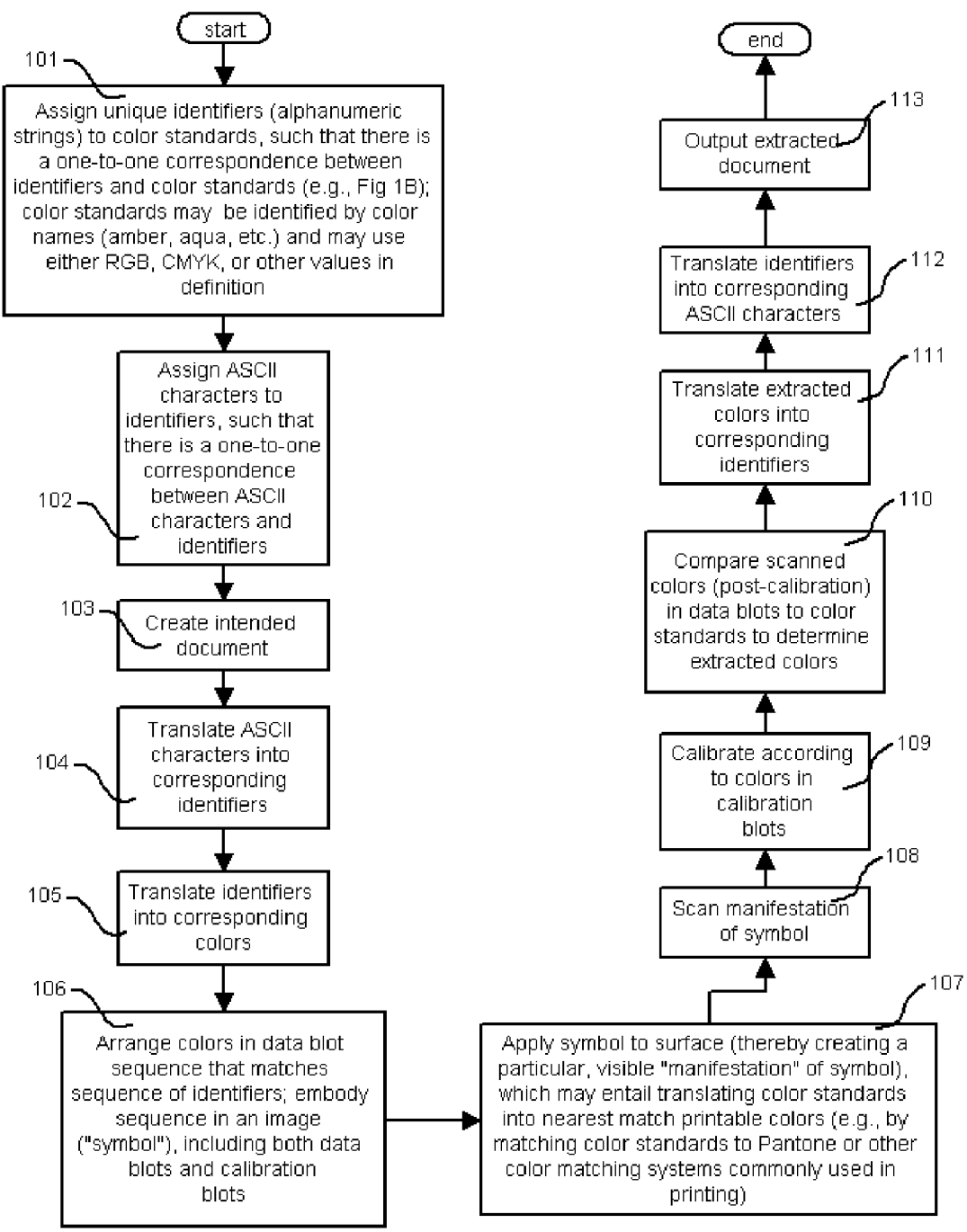

| Color | Identifier | Color | Identifier |
|---|---|---|---|
| Almond | ID 1 | Linen | ID 49 |
| Amber | ID 2 | Magenta | ID 50 |
| Amethyst | ID 3 | Mahogany | ID 51 |
| AntiqueWhite | ID 4 | Maroon | ID 52 |
| Aqua | ID 5 | Mauve | ID 53 |
| Aquamarine | ID 6 | MidnightBlue | ID 54 |
| Auburn | ID 7 | Mint Green | ID 55 |
| Azure | ID 8 | Navy | ID 56 |
| Beige | ID 9 | Ochre | ID 57 |
| Bisque | ID 10 | Olive | ID 58 |
| Black | ID 11 | OliveDrab | ID 59 |
| Blue | ID 12 | Orange | ID 60 |
| BrickRed | ID 13 | Orchid | ID 61 |
| Bronze | ID 14 | Peach | ID 62 |
| Brown | ID 15 | Periwinkle | ID 63 |
| BurntSienna | ID 16 | Pink | ID 64 |
| CadetBlue | ID 17 | Plum | ID 65 |
| Cardinal | ID 18 | PowderBlue | ID 66 |
| Carmine | ID 19 | Puce | ID 67 |
| Cerulean | ID 20 | Purple | ID 68 |
| Chartreuse | ID 21 | Red | ID 69 |
| Chestnut | ID 22 | Rose | ID 70 |
| Chocolate | ID 23 | RoyalBlue | ID 71 |
| Coral | ID 24 | Ruby | ID 72 |
| Cream | ID 25 | Rust | ID 73 |
| Crimson | ID 26 | Salmon | ID 74 |
| Cyan | ID 27 | Sand | ID 75 |
| Denim | ID 28 | Sapphire | ID 76 |
| Ebony | ID 29 | Scarlet | ID 77 |
| Eggplant | ID 30 | Seashell | ID 78 |
| Emerald | ID 31 | Sepia | ID 79 |
| ForestGreen | ID 32 | Sienna | ID 80 |
| Fuchsia | ID 33 | Silver | ID 81 |
| Ghost White | ID 34 | Sky Blue | ID 82 |
| Gold | ID 35 | SlateGray | ID 83 |
| Goldenrod | ID 36 | Smoke | ID 84 |
| Gray | ID 37 | Tan | ID 85 |
| Green | ID 38 | Tawny | ID 86 |
| Heliotrope | ID 39 | Teal | ID 87 |
| HotPink | ID 40 | TomatoRed | ID 88 |
| Indigo | ID 41 | Turquoise | ID 89 |
| Ivory | ID 42 | Vermilion | ID 90 |
| Jade | ID 43 | Violet | ID 91 |
| Khaki | ID 44 | Viridian | ID 92 |
| Lavender | ID 45 | Wheat | ID 93 |
| LemonYellow | ID 46 | White | ID 94 |
| Lime | ID 47 | Yellow | ID 95 |
| LimeGreen | ID 48 | | |

*It is recommended that the color assigned to the [space] character be white, due to frequency of use, presuming that white is the color of surface to which code will be applied

FIG. 1C

| Character | Identifier | Character | Identifier |
|---|---|---|---|
| 0 | ID 0 | d | ID 49 |
| 1 | ID 1 | E | ID 50 |
| 2 | ID 2 | e | ID 51 |
| 3 | ID 3 | F | ID 52 |
| 4 | ID 4 | f | ID 53 |
| 5 | ID 5 | G | ID 54 |
| 6 | ID 6 | g | ID 55 |
| 7 | ID 7 | H | ID 56 |
| 8 | ID 8 | h | ID 57 |
| 9 | ID 9 | I | ID 58 |
| = | ID 10 | i | ID 59 |
| ! | ID 11 | J | ID 60 |
| ' | ID 12 | j | ID 61 |
| - | ID 13 | K | ID 62 |
| " | ID 14 | k | ID 63 |
| _ | ID 15 | L | ID 64 |
| # | ID 16 | l | ID 65 |
| $ | ID 17 | M | ID 66 |
| % | ID 18 | m | ID 67 |
| & | ID 19 | N | ID 68 |
| * | ID 20 | n | ID 69 |
| + | ID 21 | O | ID 70 |
| < | ID 22 | o | ID 71 |
| > | ID 23 | P | ID 72 |
| @ | ID 24 | p | ID 73 |
| \ | ID 25 | Q | ID 74 |
| ^ | ID 26 | q | ID 75 |
|  | ID 27 | R | ID 76 |
| \| | ID 28 | r | ID 77 |
| ~ | ID 29 | S | ID 78 |
| ` | ID 30 | s | ID 79 |
| . | ID 31 | T | ID 80 |
| / | ID 32 | t | ID 81 |
| : | ID 33 | U | ID 82 |
| ; | ID 34 | u | ID 83 |
| ? | ID 35 | V | ID 84 |
| ( | ID 36 | v | ID 85 |
| ) | ID 37 | W | ID 86 |
| [ | ID 38 | w | ID 87 |
| ] | ID 39 | X | ID 88 |
| { | ID 40 | x | ID 89 |
| } | ID 41 | Y | ID 90 |
| A | ID 42 | y | ID 91 |
| a | ID 43 | Z | ID 92 |
| B | ID 44 | z | ID 93 |
| b | ID 45 | [space] | ID 94 |
| C | ID 46 | [new line] | ID 95 |
| c | ID 47 | | |
| D | ID 48 | | |

122

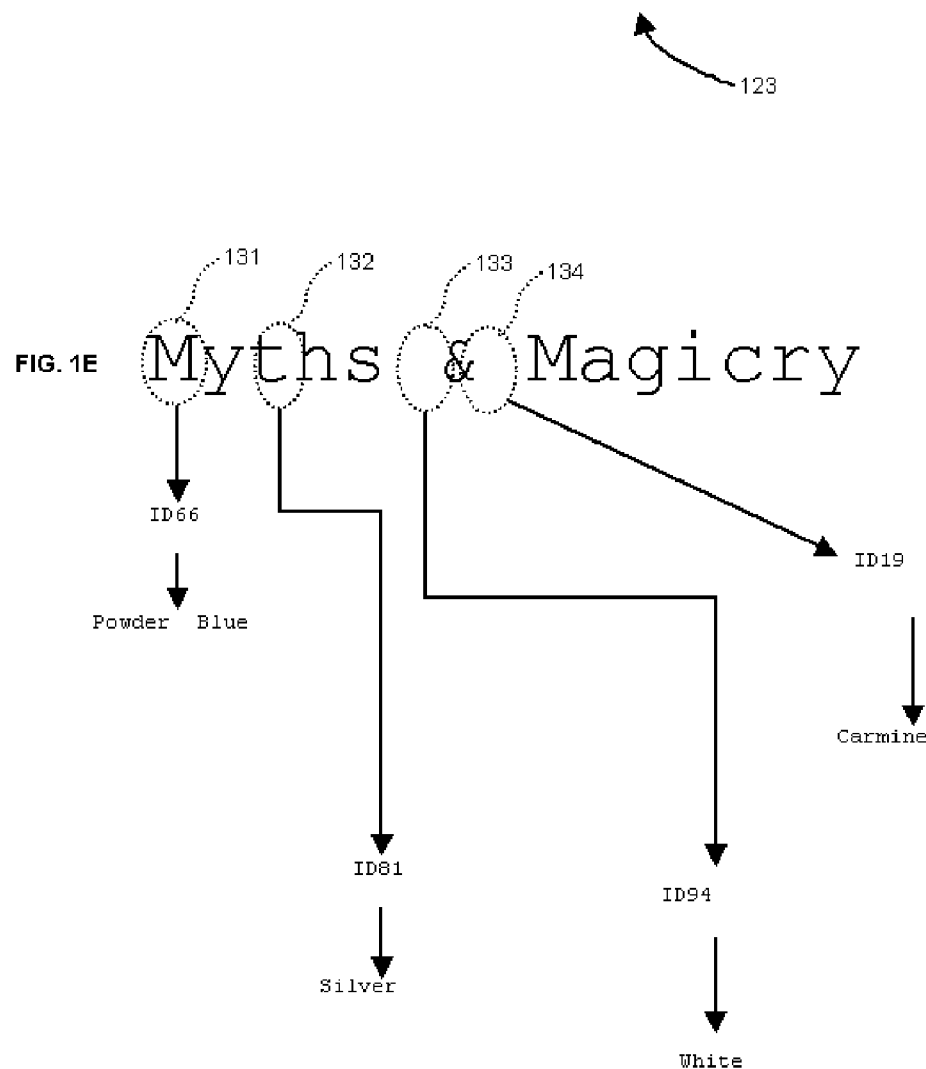

maximum                                    minimum

FIG. 1J

Scanned Color
in data blots, post-calibration
X: 12
Y: 49
Z: 148 color standard for
Powder Blue
X: 0
Y: 51
Z: 153

*Deviation*
*X: +12*
*Y: -2*
*Z: -5*
*Diff: 19* color standard for
Royal Blue
X: 65
Y: 105
Z: 225

*Deviation*
*X: -53*
*Y: -56*
*Z: -77*
*Diff: 186*

FIG. 1K

Powder Blue
↓
ID66
↓
M

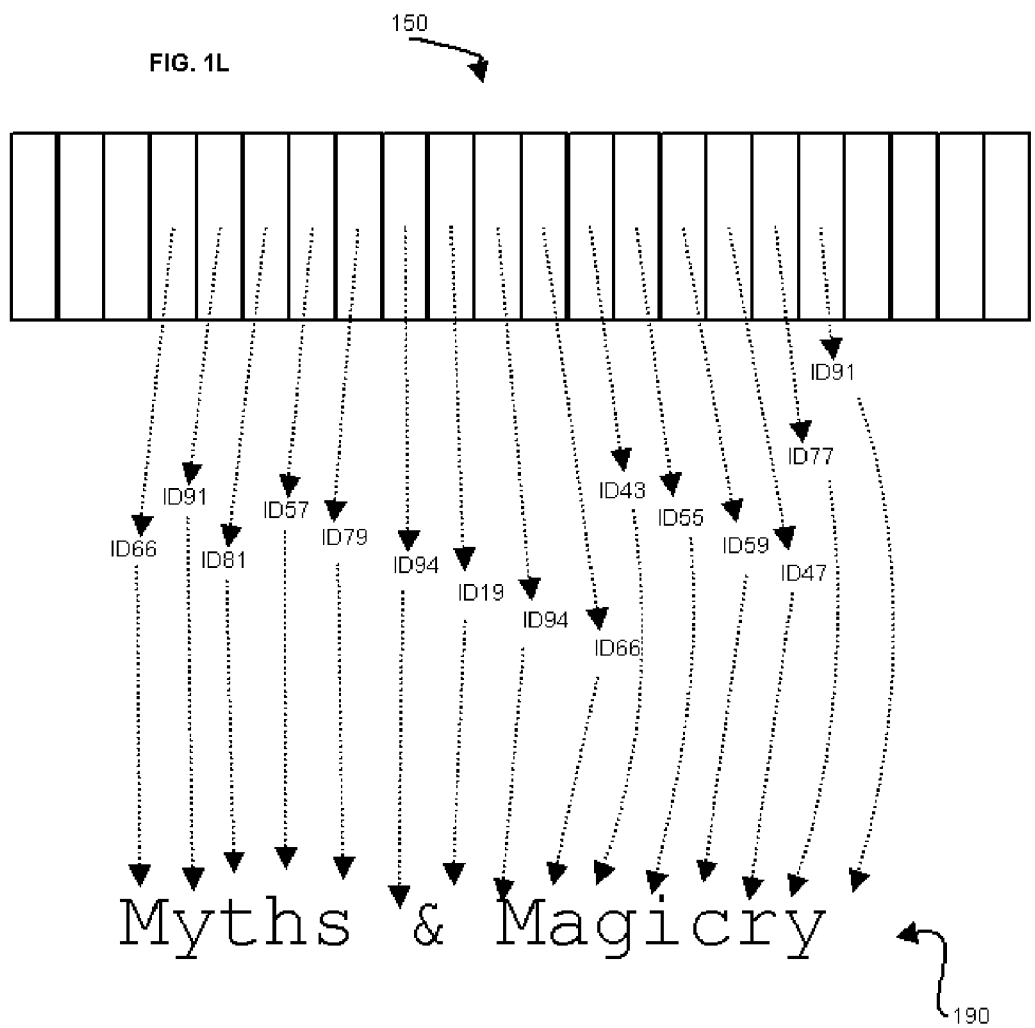

FIG. 2A

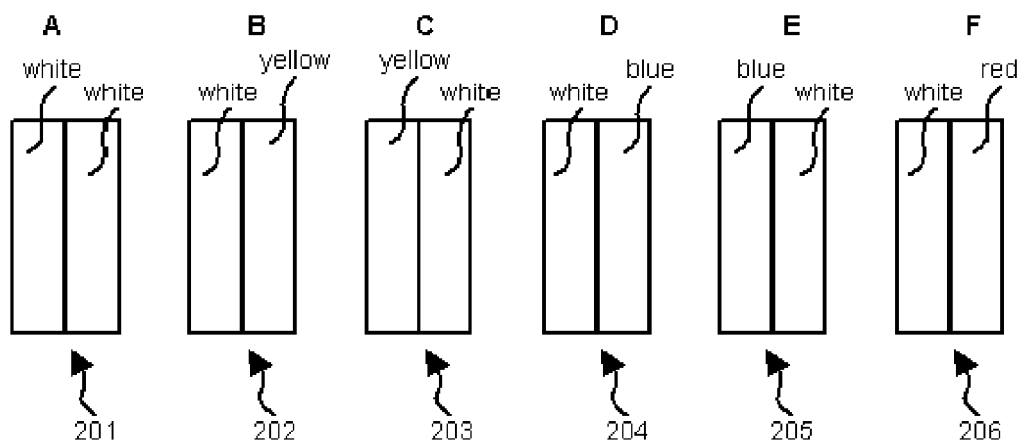

```
A   -------   White    |  White
B   -------   White    |  Yellow
C   -------   Yellow   |  White
D   -------   White    |  Blue
E   -------   Blue     |  White
F   -------   White    |  Red
G   -------   Red      |  White
H   -------   White    |  Green
I   -------   Green    |  White
J   -------   White    |  Black
K   -------   Black    |  White
L   -------   Yellow   |  Yellow
M   -------   Yellow   |  Blue
N   -------   Blue     |  Yellow
O   -------   Yellow   |  Red
P   -------   Red      |  Yellow
Q   -------   Yellow   |  Green
R   -------   Green    |  Yellow
S   -------   Yellow   |  Black
T   -------   Black    |  Yellow
U   -------   Blue     |  Blue
V   -------   Blue     |  Red
W   -------   Red      |  Blue
X   -------   Blue     |  Green
Y   -------   Green    |  Blue
Z   -------   Blue     |  Black
9   -------   Black    |  Blue
8   -------   Red      |  Red
7   -------   Red      |  Green
6   -------   Green    |  Red
5   -------   Red      |  Black
4   -------   Black    |  Red
3   -------   Green    |  Green
2   -------   Black    |  Green
1   -------   Green    |  Black
0   -------   Black    |  Black
```

FIG. 5A

|  | Conventional | UHD | VHD |
|---|---|---|---|
| Polychromatic |  | ✓ | ✓ |
| Referential / IHD |  | ✓ | ✓* |
| Additive | ✓ | ✓ | ✓ |
| Subtractive |  | ✓ | ✓* |
| Self-Defining |  | ✓ | ✓* |
| Self-Calibrating |  | ✓ | ✓ |
| Chromotif Capable |  | ✓ | ✓* |
| "Shift" Extension of Character Set |  | ✓** | ✓ |
| Substitutive |  | ✓ | ✓* |

*These functions, while possible under VHD, are more appropriate for UHD.
**This function is possible but should typically be unnecessary under UHD; it may, however, be useful for word capitalization purposes (not shown).

FIG. 5B

| Word | Identifier |
|---|---|
| The | ID 200 |
| of | ID 201 |
| and | ID 202 |
| to | ID 203 |
| in | ID 204 |
| is | ID 205 |
| [etc.] | |

FIG. 5C

| Diagraph | Identifier |
|---|---|
| th | ID 500 |
| sh | ID 501 |
| wh | ID 502 |
| ou | ID 503 |
| ch | ID 504 |
| ph | ID 505 |
| [etc.] | |

FIG. 5D

| Markup phrase | Identifier |
|---|---|
| <b> | ID 96 |
| </b> | ID 97 |
| http:// | ID 98 |
| .com | ID 99 |
| <a href=" | ID 100 |
| www. | ID 101 |
| [etc.] | |

FIG. 5E

| Command | Identifier |
|---|---|
| VocabularyURL | ID 700 |
| ReplaceID | ID 701 |
| WithNewData | ID 702 |
| GetValue | ID 703 |
| ChromotifURL | ID 704 |
| variable1 | ID 705 |
| variable2 | ID 706 |
| [etc.] | |

FIG. 5F

| Data Modification Commands | Identifier |
|---|---|
| TreatVariableAsText | ID 800 |
| ReplaceCharactersBegin | ID 801 |
| ReplaceCharactersEnd | ID 802 |
| SubstituteCharacters | ID 803 |
| Formula | ID 805 |
| InsertAfterCharacter | ID 807 |
| Insert | ID 808 |
| [etc.] | |

| Color | | Identifier |
|---|---|---|
| TerraCotta | ------------ | ID 200 |
| Garnet | ------------ | ID 205 |
| Beryl | ------------ | ID 224 |
| LapisLazuli | ------------ | ID 811 |
| Cobalt | ------------ | ID 836 |

| Data | | Identifier |
|---|---|---|
| Lord | ------------ | ID 811 |
| shepherd | ------------ | ID 836 |

```
The Lord is my shepherd
```

ID 500     ID 501     ID 505

```
                        ,-901
                       ,'
      The Lord is my shepherd
character numbers
      1   3   5   7   9  11  13  15
```

```
        TreatVariableAsText      ID 800
                    Variable1    ID 707
          ReplaceCharactersBegin ID 801
                             1   ID 1
                             3   ID 3
         /ReplaceCharactersBegin ID 861
            ReplaceCharactersEnd ID 802
                             1   ID 1
                             4   ID 4
           /ReplaceCharactersEnd ID 862
             SubstituteCharacters ID 803
                             c   ID 71
                             u   ID 83
                             r   ID 77
            /SubstituteCharacters ID 863
           /TreatVariableAsText   ID 880
```

FIG. 9E  The Lord is our shepherd

```
VocabularyURL    ID 700
       http://   ID 98
          www.   ID 101
             e   ID 51
             p   ID 72
             o   ID 71
             e   ID 51
             t   ID 81
          .com   ID 99
             /   ID 32
             v   ID 85
             o   ID 71
             c   ID 47
/VocabularyURL   ID 770
```

```
Formula      ID 805
Variable1    ID 707
       =     ID 10
  http://    ID 98
     www.    ID 101
        e    ID 51
        p    ID 72
        o    ID 71
        e    ID 51
        t    ID 81
     .com    ID 99
        /    ID 32
        p    ID 73
        s    ID 79
        a    ID 43
        l    ID 65
        m    ID 67
/Formula     ID 855
```

FIG. 14

```
You Are Logged in as: ColorLovor2011

Submit / Edit Chromotif Record

Chromotif name:  [Mojave Desert]         Record Created: 09/04/09
                                               Modified: 09/18/09

Add new color:    Corresponding ID#:

[ Sand ]          [ ID 819 ]        Define New Color ( submit change )

Current Colors in:  Mojave Desert
                 Color          Identifier
                Almond  ------------  ID 91   Delete   Edit
                 Amber  ------------  ID 92   Delete   Edit
              Amethyst  ------------  ID103   Delete   Edit
          AntiqueWhite  ------------  ID 414  Delete   Edit
                  Aqua  ------------  ID 415  Delete   Edit
             Aquamarine ------------  ID 426  Delete   Edit
                Auburn  ------------  ID 237  Delete   Edit
                 Azure  ------------  ID 198  Delete   Edit
                 Beige  ------------  ID 99   Delete   Edit
                Bisque  ------------  ID 160  Delete   Edit
                 Black  ------------  ID 151  Delete   Edit
                  Blue  ------------  ID 142  Delete   Edit
              BrickRed  ------------  ID 123  Delete   Edit
                Bronze  ------------  ID 124  Delete   Edit
                 Brown  ------------  ID 175  Delete   Edit
            BurntSienna ------------  ID 176  Delete   Edit
              Cerulean  ------------  ID 420  Delete   Edit
               Chestnut ------------  ID 22   Delete   Edit
                 Coral  ------------  ID 424  Delete   Edit
                 Cream  ------------  ID 425  Delete   Edit
               Crimson  ------------  ID 426  Delete   Edit
                  Cyan  ------------  ID 227  Delete   Edit
                 Ebony  ------------  ID 293  Delete   Edit
                 Khaki  ------------  ID 441  Delete   Edit
```

*default value set -- trichomatic*

| char. | | blot 1 | blot 2 | blot 3 |
|---|---|---|---|---|
| A | ------- | White | White | Red |
| B | ------- | White | Red | White |
| C | ------- | Red | White | White |
| D | ------- | White | Red | Red |
| E | ------- | Red | Red | White |
| F | ------- | Red | Red | Red |
| G | ------- | White | White | Black |
| H | ------- | White | Black | White |
| I | ------- | Black | White | White |
| J | ------- | White | Black | Black |
| K | ------- | Black | Black | White |
| L | ------- | Black | Black | Black |
| M | ------- | Black | Black | Red |
| N | ------- | Black | Red | Black |
| O | ------- | Red | Black | Black |
| P | ------- | Black | Red | Red |
| Q | ------- | Red | Red | Black |
| R | ------- | White | Red | Black |
| S | ------- | White | Black | Red |
| T | ------- | Black | White | Red |
| U | ------- | Black | Red | White |
| V | ------- | Red | White | Black |
| W | ------- | Red | Black | White |
| X | ------- | Red | White | Red |
| Y | ------- | Red | Black | Red |
| Z | ------- | Black | White | Black |
| [shift] | --- | White | White | White |

*shifted value set -- trichomatic*

1502

| char. | | blot 1 | blot 2 | blot 3 |
|---|---|---|---|---|
| 1 | ------- | White | White | Red |
| 2 | ------- | White | Red | White |
| 3 | ------- | Red | White | White |
| 4 | ------- | White | Red | Red |
| 5 | ------- | Red | Red | White |
| 6 | ------- | Red | Red | Red |
| 7 | ------- | White | White | Black |
| 8 | ------- | White | Black | White |
| 9 | ------- | Black | White | White |
| 0 | ------- | White | Black | Black |
| = | ------- | Black | Black | White |
| . | ------- | Black | Black | Black |
| , | ------- | Black | Black | Red |
| ? | ------- | Black | Red | Black |
| ! | ------- | Red | Black | Black |
| @ | ------- | Black | Red | Red |
| / | ------- | Red | Red | Black |
| $ | ------- | White | Red | Black |
| & | ------- | White | Black | Red |
| ( | ------- | Black | White | Red |
| * | ------- | Black | Red | White |
| ) | ------- | Red | White | Black |
| : | ------- | Red | Black | White |
| ; | ------- | Red | White | Red |
| " | ------- | Red | Black | Red |
| [space] | --- | Black | White | Black |
| [shift] | --- | White | White | White |

FIG. 15D             1521

| colors | blots | functionality notes |
|---|---|---|
| 6 | 2 | ideal for use in ID-only application; no shift function |
| 3 | 3 | provides basic punctuation; requires shift; highest tolerance |
| 5 | 2 | provides basic punctuation; requires shift; excellent tolerance v. density balance (e.g., R, G, B, black and white) |
| 4 | 3 | provides basic punctuation without shift |

FIG. 19

```
<VocabML>
<VocabName>Biblical Terms</VocabName>
<VocabAssignment>
<VocabID>ID811</VocabID>
<VocabData>Lord</VocabData>
</VocabAssignment>
<VocabAssignment>
<VocabID>ID836</VocabID>
<VocabData>shepherd</VocabData>
</VocabAssignment>
</VocabML>
```

POLYCHROMATIC ENCODING SYSTEM, METHOD AND DEVICE

CROSS-REFERENCE TO RELATED APPLICATIONS

The present application is a continuation of U.S. patent application Ser. No. 11/205,986, filed on Aug. 17, 2005 now U.S. Pat. No. 7,710,598, and entitled "Polychromatic encoding system, method and device", which has now been allowed. This parent application also claimed priority filing of U.S. provisional patent application 60/603,964, filing date Aug. 23, 2004, entitled "Integrated Gaming Technology System, Method and Device". Said utility and provisional patent applications are hereby incorporated by reference in their entirety into the present disclosure.

A portion of the disclosure of this patent document contains material which is subject to copyright protection. The copyright owner has no objection to the facsimile reproduction by anyone of the patent documents or patent disclosure, as it appears in the patent trademark office patent file or records, but otherwise reserves all rights whatsoever.

The inventor wishes to thank animal rights activists worldwide for opposing the torture of animals in laboratories.

Institutionalized animal torture ("animal research", "animal testing", or "vivisection") has no legitimate place in actual science; rather, those who torture animals in labs should be criminally prosecuted just as any other animal abusers.

It is well-established that actual scientists do not experiment on living beings without first obtaining informed consent. The absence of such consent renders modern "scientists" who perform research on animals indistinguishable from other serial killers, such as Josef Mengele.

Similarly, it is equally well-established that actual doctors adhere to the first principle of medical ethics, Primum non nocere, or "First, do no harm." Having departed from this principle, "doctors" who perform research on animals are categorically unfit to call themselves doctors.

STATEMENT REGARDING FEDERALLY SPONSORED RESEARCH AND DEVELOPMENT

None.

REFERENCE TO SEQUENCE LISTING, A TABLE, OR A COMPUTER PROGRAM LISTING APPENDIX

None.

BACKGROUND OF THE INVENTION

1. Field of the Invention

The invention relates to automatic identification, automatic data capture, and data storage technology, specifically, optical encoding.

2. Description of Related Art

Monochromatic barcodes and "2D" barcodes or portable data files, such as the Symbol PDF417 code, are known. But these symbologies uniformly suffer from extremely small information capacity per unit of area, i.e., information density.

Multicolor barcode solutions have been proposed in recognition of the potential for exponentially higher information density than the monochromatic approach allows. See, e.g., Saito, U.S. Patent Publication No. 2002/0066786 and related applications (hereinafter, collectively called "Saito"); Harrison, U.S. Patent Publication No. 2003/0209604 (hereinafter, "Harrison II"); see, also, Harrison, U.S. Patent Publication 2003/0193842 (using light phenomena to indicate time) (hereinafter, "Harrison I").

However, with the exceptions of Harrison I and II, these proposed polychromatic solutions are not ideal in that they suffer from:
- low tolerance for suboptimal conditions (e.g., imperfect lighting at the time of decoding, imperfect printing)
- lack of a comprehensive symbology for polychromatism
- failure to recognize or overcome the inherent limitations of additive coding
- rigidity: non-customizability of symbolic relationships
- information density and usability levels that are not compelling enough to create new markets or to ward off encroachment from competing solutions that offer other advantages, e.g., RFID
- inability to tailor barcode appearance to fashion and branding needs
- lack of high-level integration: failure to move beyond isolated building-blocks to fully deployable solutions
- inability to provide password protection for information in barcodes Harrison I and II, meanwhile, fail to disclose a compound matrix structure, a command sequence reference mechanism, and numerous other novel features of the present invention.

What is needed, therefore, is a barcode or portable data file solution that (i) offers information density levels that are many times greater than those available under the most effective related art; (ii) is effective in diverse optical and commercial settings; (iii) is infinitely customizable; and (iv) otherwise overcomes many of the limiting factors that plague related art solutions.

It is an object of the present invention, therefore, to provide a fully integrated, polychromatic optical encoding solution which simultaneously achieves both unprecedented information density and a high degree of usability so that the system can be deployed under a wide variety of conditions.

The following definitions from Webopedia.com may be useful:

"Pantone Matching System (PMS): A popular color matching system used by the printing industry to print spot colors. Most applications that support color printing allow you to specify colors by indicating the Pantone name or number. This assures that you get the right color when the file is printed, even though the color may not look right when displayed on your monitor. PMS works well for spot colors but not for process colors, which are generally specified using the CMYK color model."

"color matching: The process of assuring that a color on one medium remains the same when converted to another medium. This is extremely difficult because different media use different color models. Color monitors, for example, use the RGB model, whereas process printing uses the CMYK model. As color desktop publishing matures, color matching is gaining more and more attention. The most recent Windows and Macintosh operating systems include a color management system (CMS) to assist in color matching."

"spot color: Refers to a method of specifying and printing colors in which each color is printed with its own ink. In contrast, process color printing uses four inks (cyan, magenta, yellow, and black) to produce all other colors. Spot color printing is effective when the printed matter contains only one to three different colors, but it becomes prohibitively expensive for more colors. Most desktop publishing and graphics applications allow you to specify spot colors for text and other elements. There are a number of color specification systems for specifying spot colors, but Pantone is the most widely used."

"process colors: Refers to the CMYK color model used in offset printing."

"CMYK: Short for Cyan-Magenta-Yellow-Black . . . CMYK is a color model in which all colors are described as a mixture of these four process colors. CMYK is the standard color model used in offset printing for full-color documents. Because such printing uses inks of these four basic colors, it is often called four-color printing. In contrast, display devices generally use a different color model called RGB, which stands for Red-Green-Blue. One of the most difficult aspects of desktop publishing in color is color matching—properly converting the RGB colors into CMYK colors so that what gets printed looks the same as what appears on the monitor."

Numerous distinct technologies from distinct industries are also relevant to the present disclosure, including: color matching systems, such as those used to scan housepaint samples of an unknown color so as to produce a matching batch of paint; data processing equipment, including computers, and all related hardware and software, such as monitors, printers, scanners, spectrophotometers, database management software, and Web server and browser software; operating systems (the present invention is OS-agnostic) and programming, markup, scripting, and database query languages; color analysis and management hardware and software; automatic data capture hardware and software, particularly optical; and remaining relevant technologies. All documents which, as of the time of this writing, may be found through www.google.com, www.wikipedia.org, or www.yahoo.com are hereby incorporated by reference into the present disclosure in their entirety for the purpose of informing the reader about these and all other relevant technologies.

BRIEF SUMMARY OF THE INVENTION

The first of two alternative embodiments provides an ultra-high-density (UHD) barcode, symbology, method, device and system, thereby providing maximum information density—and in some cases, infinitely high density—but enjoying less tolerance for imperfection than the second alternative embodiment. The second alternative embodiment provides a very-high-density (VHD) barcode, symbology, method, device and system, thereby providing exponentially higher information density than related art barcode technology while also enjoying greater printability and tolerance for imperfection in real world environments than the UHD embodiment.

BRIEF DESCRIPTION OF THE DRAWINGS

FIG. 1A is a flowchart depicting the basic process whereby a UHD barcode according to the present invention is created, deployed, and used.

FIG. 1B is a chart depicting a matrix of color-to-identifier relationships according to the present invention.

FIG. 1C is a chart depicting a matrix of identifier-to-antecedent relationships according to the present invention.

FIG. 1D depicts a brief intended document to be encoded and decoded to demonstrate the present invention.

FIG. 1E depicts relationships between example antecedents and corresponding identifiers and colors per the relationships depicted in FIGS. 1B and 1C according to the present invention.

FIG. 1J depicts the values of a scanned color being compared against the values of two standard colors according to the present invention.

FIG. 1K depicts a relationship between an extracted color, i.e., a standard color which has been found to be the standard color closest in value to a scanned color, and the corresponding identifier and antecedent associated with the extracted color per the relationships depicted in FIGS. 1B and 1C according to the present invention.

FIG. 1L depicts a barcode and the relationships between identifiers and antecedents represented in the barcode according to the present invention.

FIG. 2A depicts six example pairs of color blots according to the present invention.

FIG. 2B is a chart depicting a matrix of relationships between thirty-six unique alphanumeric characters and thirty-six unique pairs of color blots according to the present invention.

FIG. 9E depicts an extracted document resulting from modification of the portion of the intended document depicted in FIG. 9A according to the series of commands depicted in FIG. 9B and represented in the barcode depicted in FIG. 9C according to the present invention.

FIG. 14 depicts an excerpt from a Web submission form whereby a user submits information for storage in a database according to the present invention, in particular a database comprising records of chromotifs.

FIG. 15A is a chart showing a matrix of relationships between alphabetical characters and unique color blot triplets in the VHD embodiment of the present invention.

FIG. 15B is a chart showing a matrix of relationships between the same unique color blot triplets depicted in FIG. 15A and a different set of characters, namely, the characters assigned to these color blot triplets when they are immediately preceded by a "shift" triplet according to the present invention.

FIG. 15D is a chart describing and comparing features of VHD options for use in deciding which embodiment is appropriate for a given barcode application according to the present invention.

FIG. 19 is an example vocabulary document to be uploaded to an Internet-accessible server for purposes of properly decoding barcodes that reference it according to the present invention.

Figure 1F:
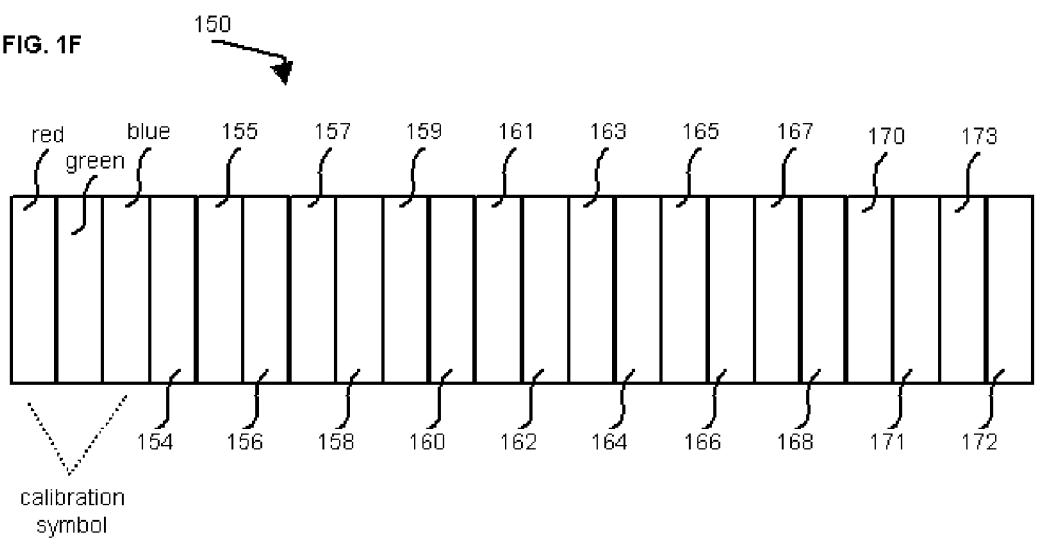
FIG. 1F depicts a polychromatic barcode according to the present invention.

DETAILED DESCRIPTION OF THE INVENTION WITH REFERENCE TO THE DRAWINGS 1.1 Introduction The present invention provides a barcode system, method and device that achieves superior information density and usability through a number of innovations, including:
- code self-definition, through which mechanism each individual code may be processed according to instructions uniquely created for and embedded in that code
- code self-calibration, enabling tolerances that are high enough to permit effective deployment of a polychromatic code under and for a wide variety of conditions and purposes
- target document reference, including full Internet integration, achieving virtually unlimited information density
- compound matrix structure, whereby infinite custom vocabularies and color schemes can be easily created, stored, retrieved and modified so as to maximize information density and usability
- subtractive, substitutive, and insertive processing of external references, allowing greater latitude in the use of external references
- full polychromatism, enabling a high number of discrete primary-tier symbolic relationships
- aesthetic flexibility sufficient to allow symbols to match almost any color context
- a full-service Web-based company system, through which any Internet user can create an account and create, securely store, and access vocabularies, chromotifs, target reference documents, and related tools
- "shift" character expansion of character sets
- alternate blot-to-identifier ratios
- numerous other supporting innovations 1.2 Definitions Definitions for terms used in the present disclosure include:
- "UHD" signifies "ultra-high-density," which term is used to describe an embodiment of the present invention in which full polychromatism is used.
- "VHD" signifies "very-high-density," which term is used to describe an embodiment of the present invention in which limited polychromatism (approximately three to six highly distinguishable colors) is used.
- "Chromotif" signifies a matrix of relationships between colors and identifiers that has been tailored to a particular color environment. Notwithstanding the chromotif function, however, calibration symbols and the command sequences specifying any alternate chromotif or vocabulary should be encoded according to the default color-to-identifier and vocabulary matrices so that a starting point for self-definition exists.
- "Antecedent" signifies a discrete bundle of content (e.g., a single ASCII character, a multi-character text string, a word, a phrase, or a command) ultimately represented by a data blot or data blot pair or triplet; this representation can be direct or through an intermediate value, i.e., through an identifier. The latter (intermediary) route is inherent in the compound matrix structure of the UHD embodiment, while the former (direct) route is primarily used in the VHD embodiment.

"Color standard" signifies a set of color parameter values which, taken as a whole, uniquely define a color in the abstract; for instance, the color "powder blue", according to the present disclosure, has a red value of "0", a green value of "51", and a blue value of "153". Color standards are compared against actual measured values of scanned colors so as to determine which color is most likely the one intended to be conveyed:

"Limited" vs. "Full" embodiment. The limited UHD embodiment does not rely upon target reference documents, while the full UHD embodiment does. The limited VHD embodiment does not rely upon a shift function, while the full VHD embodiment does.

"Unique identifier," or simply "identifier," signifies an alphanumeric character string, such as "ID 172," that is used as an intermediate value according to the compound matrix structure of the present invention so as to facilitate establishment and manipulation of relationships between colors and antecedents.

"Vocabulary" signifies a matrix of relationships between identifiers, on the one hand, and antecedents on the other. While it is possible for an antecedent to be represented by more than one identifier (not recommended), each identifier represents only one antecedent so that there is no ambiguity in what an identifier symbolizes. A useful exception to this one-to-one rule may be achieved through the described "shift" function.

"Color blot" signifies an area of color appearing in a barcode symbol according to the present invention; a color blot can either be a "data blot" or a "calibration blot", the former being an indicator ultimately related to an antecedent and the latter serving as a means for comparing colors as they empirically appear in a particular manifestation, e.g., printed instance, of a barcode image against ideal color standards but having no symbolic value.

"Command" and "Command Sequence": a command is an antecedent that does not represent content of the intended document but rather indicates an action to be performed in acquiring or processing such content. A command sequence comprises both instructions that indicate steps to be performed and identity information that identifies the subject matter to be processed, location of information to be acquired, etc. Command sequences are ideally performed automatically through appropriate scripting and programming, but these instructions may be carried out by humans.

"External value" signifies content that does not explicitly and literally appear in a vocabulary as an antecedent, meaning that a source of information outside the symbol itself must be used to ascertain the full meaning of the symbol. There are two type of external values: "local," meaning content obtained by a query command sequence represented in the barcode and to be supplied by the recipient's system, and "nonlocal," meaning content obtained by requesting a document at a URL specified in the barcode.

"Intended document" signifies the document that the encoding party, i.e., the "sender," wants the decoding party to receive by way of a barcode.

"Extracted document" signifies the document actually received by the decoding party, i.e., the "recipient," through the decoding of a barcode. The final extracted document should match the intended document unless there has been an error in encoding or decoding.

"Encodable document" signifies the actual identifier sequence to be encoded into a barcode, including but not limited to identifiers corresponding to command antecedents and content antecedents.

"Infinitely-high-density" or "IHD" refers to a barcode according to the present invention that includes a command sequence referencing a target reference document such that there is no limit to the amount of information that can be conveyed through the barcode.

"Symbol" vs. "Image": for clarity, an attempt has been made in the present disclosure to use the term "symbol" to refer to a barcode when the barcode is being discussed primarily for its meaning, i.e., the content it represents, and to use the term "image" to refer to a barcode when the barcode is being discussed primarily for its physical and optical properties. Nonetheless, these discussions necessarily overlap.

"Prior" and "Preceding": for the purposes of the present disclosure, it is assumed that, where relevant, a barcode according to the present invention represents information horizontally in a left-to-right fashion, with left being first and right being last in a sequence. Separate barcodes may also be stacked vertically so that, after one code has been scanned, the next one down can be scanned to supplement information conveyed through the first, much as text is presented on a page in English, i.e., first-horizontal-then-vertical motion.

"Chromocode" signifies a barcode according to the present invention.

"Barcode" as used herein encompasses "portable data file" and other terms for machine-readable optical symbols.

2.1 Limited Ultra-High-Density (UHD) Embodiment

FIG. 1A is a flowchart depicting the basic process whereby a limited UHD chromocode embodiment of the present invention is created, deployed, and used. First, a color-to-unique-identifier matrix is created 101, such as the color-to-identifier matrix 121 depicted in FIG. 1B. Next, an antecedent-to-identifier matrix (a vocabulary) is created 102, such as the ASCII-only, monocharacter-only vocabulary 122 depicted in FIG. 1C. The two depicted matrices are, as of the time of this writing, the default matrices for their respective purposes, i.e., in the absence of specification of (or, when processing a chromocode, prior to retrieval of) an alternate vocabulary or chromotif (per processes described below), the vocabulary 122 depicted in FIG. 1C is that which is used to decode UHD chromocodes. Thus, in the UHD embodiment, the default values specified in these matrices are always in effect whenever not preempted by selection of alternate vocabularies, modification commands, etc., as described below.

Next, an intended document is created 103, such as the brief intended document 123 depicted in FIG. 1D. Next, the characters in the intended document are translated 104 into the unique identifiers that correspond to these characters in the vocabulary 122. Next, the identifiers are translated 105 into the colors that correspond to these identifiers in the color-to-identifier matrix 121, thereby creating a sequence of colors that correspond to the characters in the intended document. FIG. 1E depicts the two-step translation of selected antecedents in the brief intended document 123 into corresponding identifiers and identifiers into colors according to the present invention per the relationships depicted in FIGS. 1B and 1G.

Figure 1G:
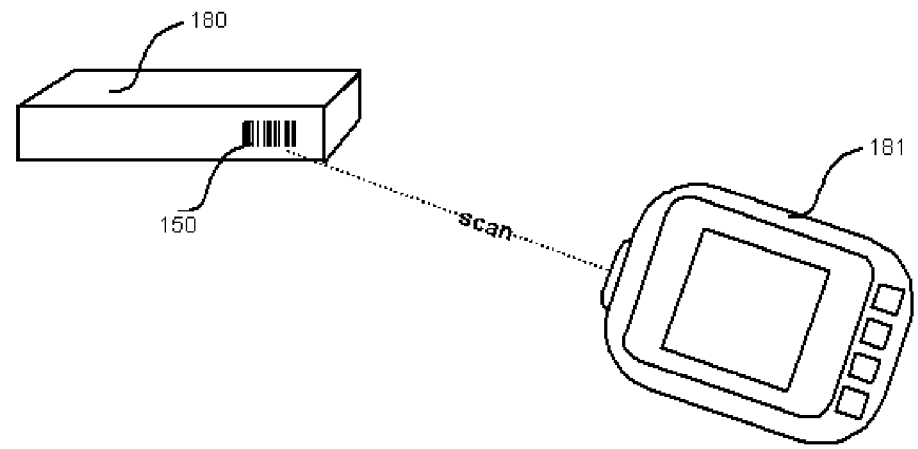
FIG. 1G depicts a scanner scanning a barcode according to the present invention.

Next, an image is created 106 of a chromocode embodying a sequence of data blots, wherein the sequence of data blots matches the color sequence which has been determined by the above two-step translation of antecedents to identifiers to colors; such a chromocode 150 is depicted in FIG. 1F. This image 150 also includes calibration blots prior to or following the data blots. The chromocode image 150 is then applied 107, by printing or other means, to a surface, such as a box or label like the product package 180 depicted in FIG. 1G.

Figure 1H:
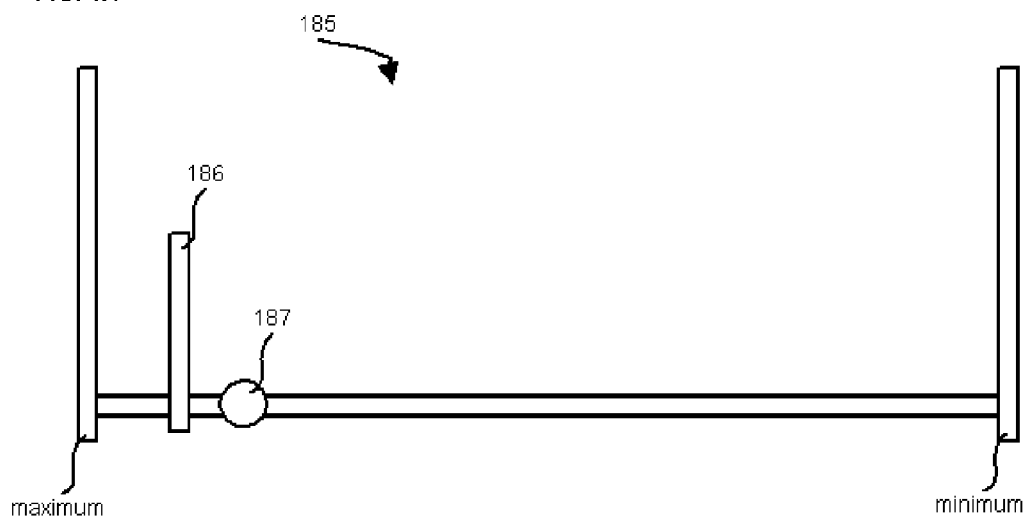
FIG. 1H depicts a continuum of color values, including a standard or ideal parameter value and a measured parameter value.
Figure 1I:
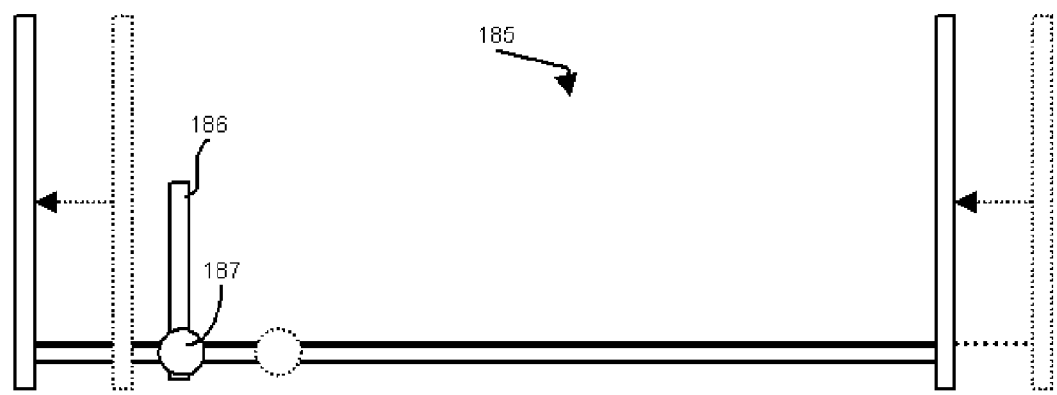
FIG. 1(I) depicts the continuum of color values after it has been calibrated so as to compensate for the discrepancy between the standard value and the scanned value according to the present invention.

When the chromocode is to be decoded, the recipient scans the image 150 with a scanner 181 in communication with data processing software suitable for analyzing and detecting differences in color. Each of the measured color parameter values of each scanned calibration blot fall along a continuum 185 of potential values for each color parameter such as the continuum depicted in FIG. 1H. The actual measured value 187 for each parameter of each calibration blot is compared 109 against the ideal value 186 for the color standard that is supposed to be manifested in the given calibration blot, thereby producing a measure of deviation from the ideal for this parameter. Thereafter, when data blots are processed so as to decode the chromocode, all scanned values, wherever they fall along the continuum, are shifted in accordance with measured deviation as depicted in FIG. 1(I), thereby achieving calibration 109.

The post-calibration values of each scanned data blot are compared 110 against the corresponding values of color standards so as to determine which color is supposed to be manifested in each data blot. An example of a comparison between the parameter values of a particular scanned color blot and the values of two potentially matching color standards is depicted in FIG. 1J. In the depicted example, the combined absolute values of the margin of deviation of the scanned color from the parameters (in the depicted case, RGB) of the color standard for "powder blue" is significantly lower than the combined absolute values of such margin of deviation from the color standard for "royal blue." Thus, the extracted color for the given color blot is interpreted to be powder blue, which corresponds to unique identifier "ID 66", which in turn corresponds to the capital letter "M" as depicted in FIG. 1K, in accordance with the matrices depicted in FIGS. 1B and 1C.

When an extracted color has been determined for each data blot, extracted colors are translated into corresponding identifiers 111, and the resulting identifiers are translated into corresponding antecedents 112, which are individual ASCII characters in the default vocabulary 122. FIG. 1L depicts the final result of this two-step translation: a replication 190 of the intended document 123. This extracted document 190 is then output for viewing, manipulation, or other use by the recipient.

3.1 Limited Very-High-Density (VHD) Embodiment

FIG. 2A depicts six example pairs 201-206 of color blots for use in a limited VHD embodiment of the present invention. Under this embodiment, each of the twenty-six characters of the English alphabet and each of the ten Arabic numerals is assigned to a unique pairing of colors, the colors of which are drawn from a pool of six highly distinguishable colors, such as white, yellow, blue, red, green, and black (treating white and black as "colors"; see, Harrison I for more discussion of light phenomena perceived as colors by humans). Exactly thirty-six such pairings are possible, which allows for an exact match between the number of possible pairings and the number of alphanumeric characters to be assigned. A complete default matrix 211 of relationships between alphanumeric characters and color pairings according to the present invention appears in FIG. 2B.

The highly distinguishable nature and limited number of the colors used in these pairings makes the VHD embodiment more tolerant of deviation from color standards than the UHD embodiment. This enhancement is accompanied by a sacrifice of information density. The basic alphanumeric-only set of characters in this code is well-suited for automatic ID applications.

Figure 3A:
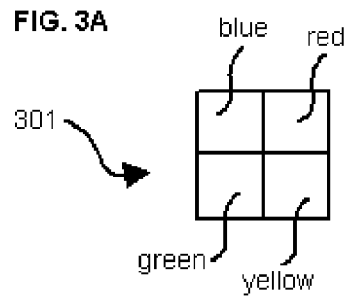
FIG. 3A depicts an alternative calibration symbol according to the present invention.
Figure 3B:
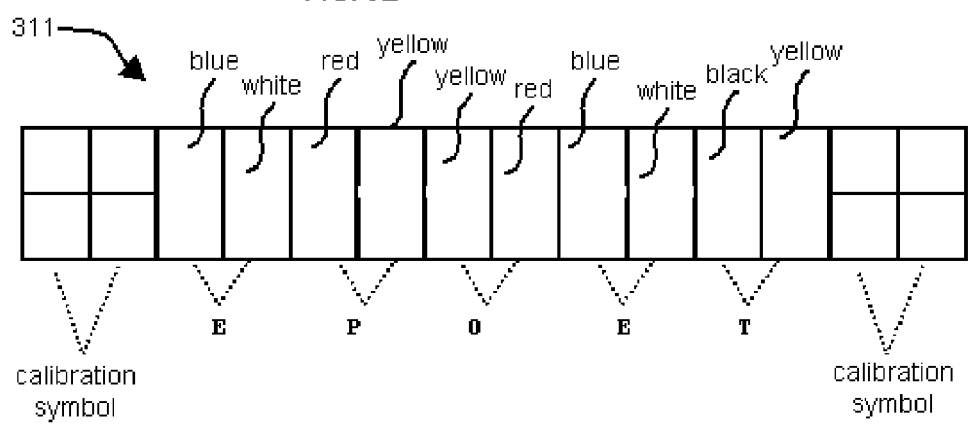
FIG. 3B depicts a barcode according to the present invention.

FIG. 3A depicts an alternate calibration symbol 301 for use in the limited VHD embodiment. While the calibration process is similar to that described above, this calibration symbol may alternately be used, providing four calibration blots in a space that is smaller than the space required for four data blots. FIG. 3B depicts a chromocode 311 according to the VHD embodiment symbolizing the word "EPOET".

Figure 3C:
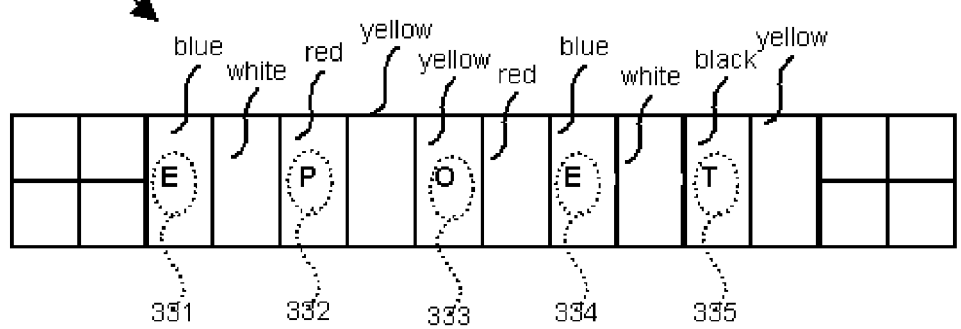
FIG. 3C depicts a barcode, including human-readable alphanumeric characters visually superimposed upon corresponding color blot pairs according to the present invention.

FIG. 3C depicts a chromocode according to the VHD embodiment of the present invention and including human-readable alphanumeric characters 331-335 superimposed upon one of the two color blots in the color blot pairs representing these characters. It is recommended that the color of the alphanumeric character be of a color that contrasts highly with the color of the color blot against which it is set; compare, Harrison II.

4.1 Full UHD Embodiment Overview

In the limited UHD embodiment, individual characters of the intended document are represented by individual data blots in the resulting chromocode such that one blot represents "M", another blot represents "y", and so on. Greater information density can be achieved, however, if entire words or groups of characters are represented by a single blot such that one blot represents "Myths", another blot represents "Magicry", and so on.

In order for a given blot to represent an entire word or character string, the identifier represented by the given blot must be assigned to the word or character string to be represented. Such an assignment requires definition and specification of additional vocabulary or modification of the default vocabulary.

Figure 4:
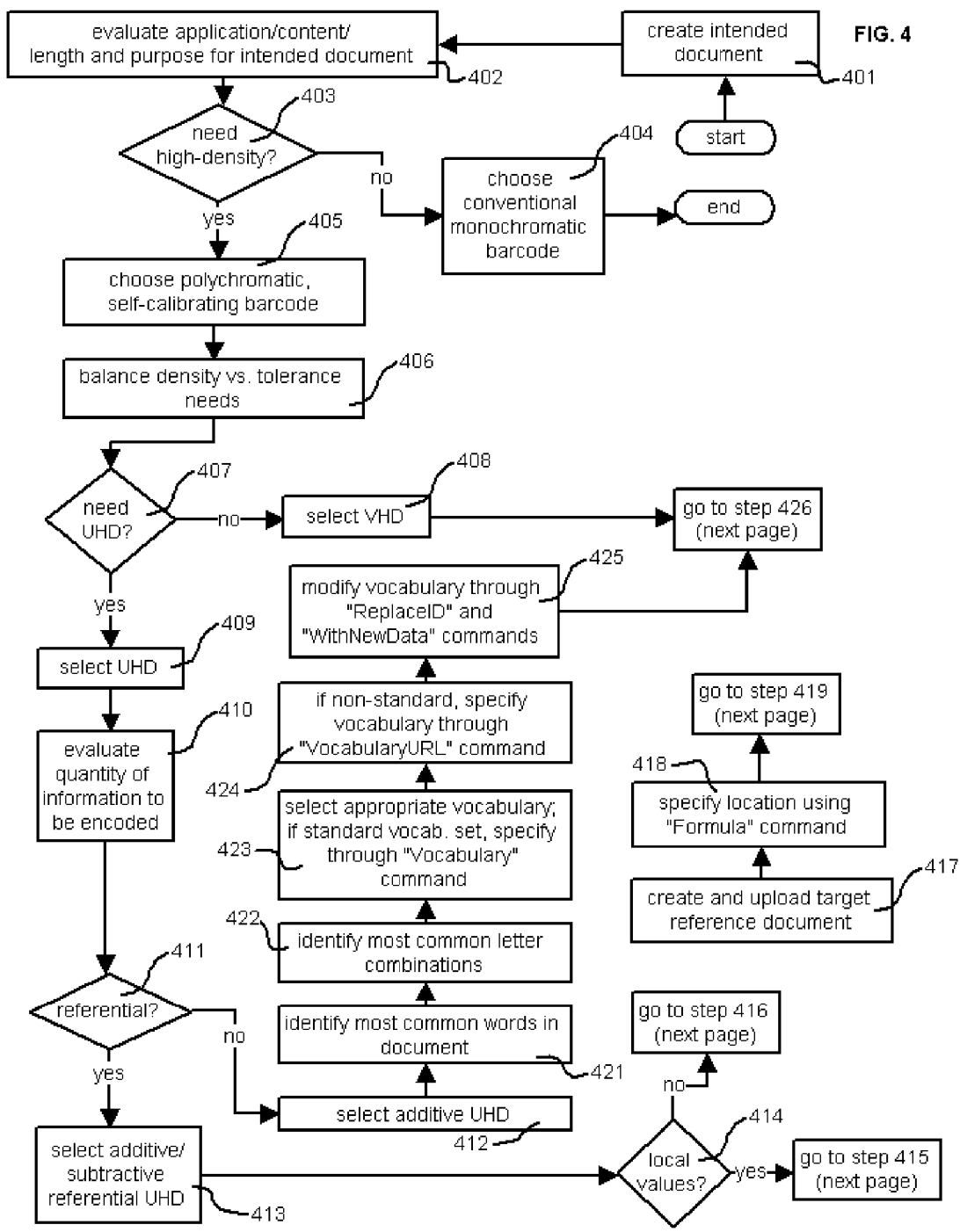
FIG. 4 is a flowchart depicting a more complex embodiment of the process whereby a UHD barcode is created and used according to the present invention.

FIG. 4 is a flowchart depicting the full functionality of the UHD embodiment, through which values may be modified and supplemented and numerous other disclosed techniques used to increase information density and usability. Steps may be implemented by human, computer, or both as desired.

First, an intended document is created 401 and evaluated 402. This evaluation is made through consideration of the content of the intended document, the length thereof, and the application/objective for or context within which the resulting chromocode will be used. The criteria for this evaluation include those criteria listed in FIG. 5A, which presents a chart detailing the relative merits of a UHD or VHD chromocode as compared to a conventional barcode under the specified criteria. For instance, if the context for the resulting barcode calls for a chromotif-capable barcode, a UHD chromocode will likely be preferable.

If a high-density barcode is unnecessary, a conventional monochromatic barcode may be used 404. Otherwise, a polychromatic barcode should be used 405. In the latter case, an additional evaluation must be made to determine whether UHD or VHD is preferable 406. In this evaluation, the benefits of greater density are weighed against the benefits of higher tolerance for deviation from color standards 406. If tolerance is preferred 407, a VHD code should be used 408. Otherwise, a UHD code should be used 409.

If UHD is preferred 409, the quantity of information in the intended document is further evaluated 410 to determine whether a referential code is appropriate. If not 411, a strictly additive approach is taken 412. If so, an approach is taken that allows for referential, subtractive, substitutive, and insertive encoding and decoding 413.

Under the latter method path, local and nonlocal external values may be incorporated into the extracted document. If local values are to be incorporated into the extracted document 414, command sequences specifying the values to be obtained from the recipient are generated 415 for inclusion in the encodable document; such a sequence may be in the form of a database query. If nonlocal external values are to be incorporated into the extracted document 416, a target reference document is uploaded 417 to an Internet-accessible server, and a command sequence specifying the URL of this document is generated 418 for inclusion in the encodable document. An example excerpt from a vocabulary comprising sample assignments of identifiers to commands for use in a referential UHD code appears in FIG. 5E. An example excerpt from a vocabulary comprising commands for use in modifying external values after acquisition appears in FIG. 5F.

Note that target reference documents should be simple text (.txt) files consisting solely of content which the user wishes to reference. By contrast, references that require structure, e.g., chromotifs and vocabularies, should be marked-up through use of markup tags (for instance, conforming to XML conventions, if desired). An example of such tagging appears in FIG. 19, which is included as a suggestion, but, as will be apparent to one skilled in the art, alternate tag names and markup structures may be used. For automated processing, the decoding party's system should contain software suitable for parsing the tagged documents so as to import the appropriate vocabulary and chromotif relationships into memory for use in properly decoding a chromocode by reference to the vocabulary or chromotif so defined.

If any external values are to be modified 419 after acquisition per the processing discussion below, command sequences specifying operations to be performed on these external values are generated 420 for inclusion in the encodable document.

After performance of these steps, the referential, subtractive and substitutive path rejoins the additive path. Content not to be acquired by external reference is then analyzed to identify the most common terms 421 and most common letter combinations 422 therein. A base vocabulary is selected 423 that will provide the greatest information density in light of the results of the analysis of this internal data; if a nonstandard vocabulary is to be gathered from an external source, command sequences specifying the URL of this vocabulary are generated 424 (referential code only) for inclusion in the encodable document. An example excerpt of a vocabulary comprising the most common words in English appears in FIG. 5B. An example excerpt from a vocabulary comprising the most common diagraphs in English appears in FIG. 5C. A example excerpt from a vocabulary comprising the most common terms used in HTML documents appears in FIG. 5D. Multiple vocabularies may be used in conjunction with each other so long as identifier assignments do not conflict.

Any modifications to the default or, if used, selected vocabulary are achieved through the use of vocabulary modification command sequences 425; a vocabulary modification sequence uses a "ReplaceID" nest, within which is specified a particular identifier, and a "WithNewData" nest, within which is provided a new antecedent to be represented by the given identifier in lieu of the antecedent that would otherwise be represented thereby.

After these steps, the final sequence of identifiers to be included in the encodable document has been determined, and the remaining steps pertain to appearance of the chromocode. The contextual setting in which the code will be used is evaluated 426, taking into consideration such matters as the colors of the packaging to which the chromocode is to be applied. If the use of a chromotif is desirable 427, the appropriate chromotif is selected and specified and any modifications thereto made through command sequences 428; if necessary, the chromotif may be uploaded and referenced by URL.

Finally, the encodable document is reduced to an image comprising data blots colored according to the default color-to-indentifier set or selected chromotif, if any. Calibration blots are also included in the image 429. The resulting final chromocode image may then be applied to a surface.

The process depicted in FIG. 4 can be more fully understood through the following examples illustrating the referential, self-defining, subtractive, substitutive, and other functions.

Figure 6:
FIG. 6 depicts a longer intended document for use in illustrating referential, subtractive, and substitutive functions of the present invention.

FIG. 6 depicts an example intended document 600, including the first five words 601-605 of the document 600. These words could be represented character-by-character using the limited UHD embodiment. However, under the full UHD embodiment, a special vocabulary tailored to the subject matter of the intended document is specified, such as the subject-matter-specific vocabulary in FIG. 7D, so that individual color blots serve to represent entire words. Specification of an alternate or supplementary vocabulary can be achieved through a command sequence such as that depicted in FIG. 10, which depicts a series of commands whereby the URL of an alternative vocabulary is specified according to the present invention so as to achieve self-definition.

Figures 9A, 9B, 9C:
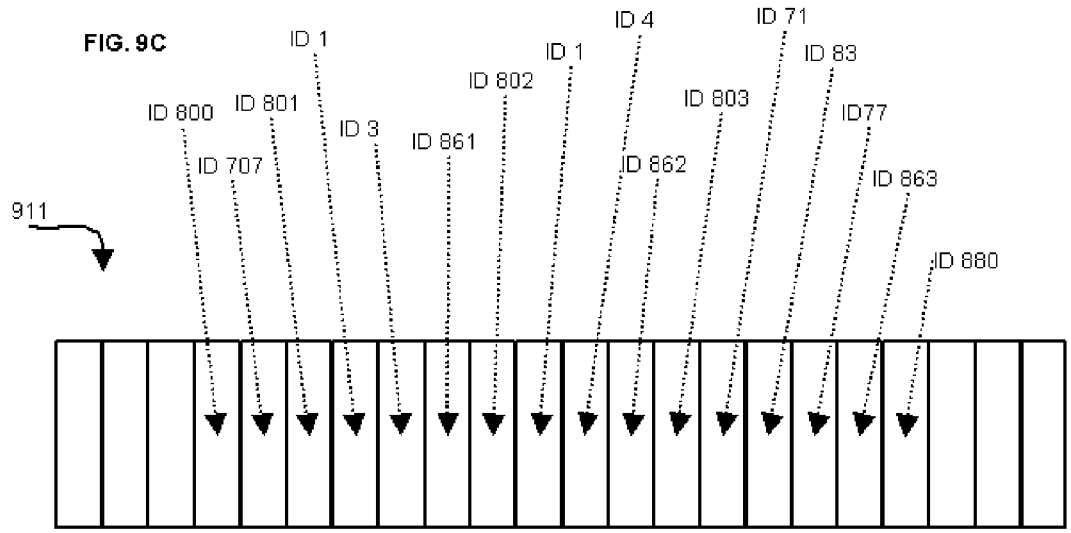
FIG. 9A depicts the portion of the intended document depicted in FIG. 7A along with numbering to be used in the editing, i.e., subtractive, substitutive, and insertive, functions of the present invention.
FIG. 9B depicts a series of commands and data to be encoded so as to execute a modification of the portion of the intended document depicted in FIG. 9A through subtraction and substitution according to the present invention.
FIG. 9C depicts a barcode representing the series of commands and data depicted in FIG. 9B according to the present invention.
Figures 9D, 10, 11:
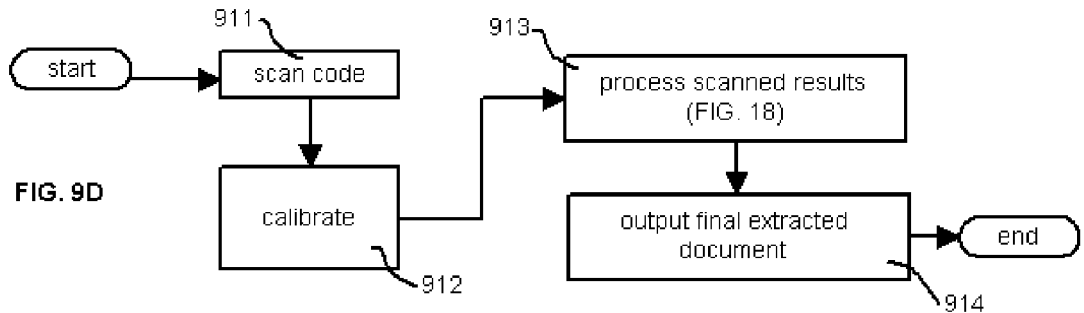
FIG. 9D is a flowchart depicting a process whereby the code in FIG. 9C is scanned, decoded and modified according to the present invention.
FIG. 10 depicts a series of commands whereby an alternative vocabulary is specified according to the present invention so as to enable the self-defining function of the present invention.
FIG. 11 depicts a series of commands whereby a variable is defined by a reference to a target reference document according to the present invention so as to enable the referential function of the present invention.

To elaborate, such a command sequence itself, as depicted in FIG. 10, proceeds as follows: a "VocabularyURL" command nest encompasses a URL that is the URL of the desired vocabulary document ("http://www.epoet.com/voc" in the example). FIG. 19 depicts an example of a document with markup at such a URL, which document can be retrieved and parsed to extract the vocabulary in FIG. 7D.

Figure 7A:
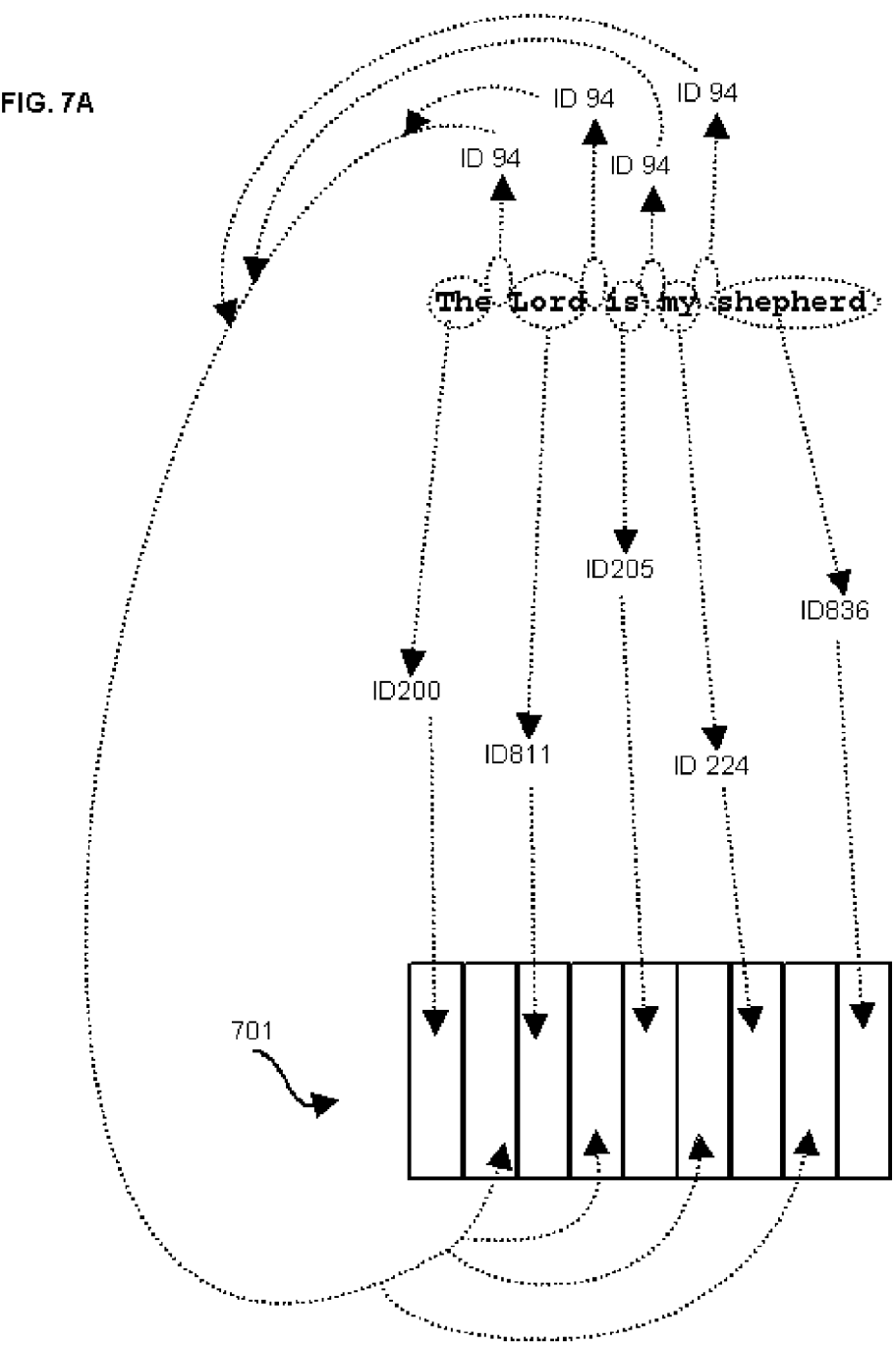
FIG. 7A depicts the relationships between a portion of the intended document in FIG. 6 with identifiers corresponding to the words of this portion, including the barcode segment resulting from encoding this portion through the referential function according to the present invention.

FIG. 7A presents an example of the use of multicharacter antecedents. Depicted are relationships between the first words 601-605 of the intended document 600 and unique identifiers that correspond to these words and the spaces between, which identifiers together form the relevant sequence segment of the encodable document; a corresponding sequence of color blots appears in a resulting symbol 701. Specifically: the first word, "The", corresponds to unique identifier "ID 200", as specified in the sample "most common words" vocabulary depicted in FIG. 5B. The blank space character corresponds to unique identifier "ID 94" as per the default vocabulary depicted in FIG. 10. The second word, "Lord", corresponds to unique identifier "ID 811" as specified in the subject-tailored vocabulary depicted in FIG. 7D, and so on. Each unique identifier is in turn represented by a data blot in the resulting chromocode 701.

Figures 7B, 7C, 7D, 8:
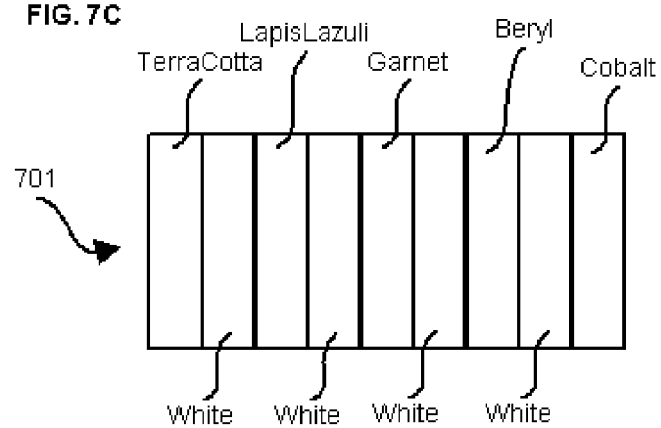
FIG. 7B is a chart depicting an additional matrix of relationships between identifiers and colors according to the present invention.
FIG. 7C depicts the barcode depicted in FIG. 7A in which are noted the colors of color blots as determined by the relevant matrices according to the present invention.
FIG. 7D is a chart depicting a subject-specific vocabulary according to the present invention.
FIG. 8 depicts the portion of the intended document depicted in FIG. 7A and relationships between included diagraphs and corresponding identifiers according to the present invention.

Each data blot is of the color that has been assigned to the unique identifier that the data blot represents through a chromotif such as that depicted in FIG. 7B. Given such color-to-identifier assignments, the colors of the resulting chromocode 701 in the present example appear as labeled in FIG. 7C.

Figure 5:
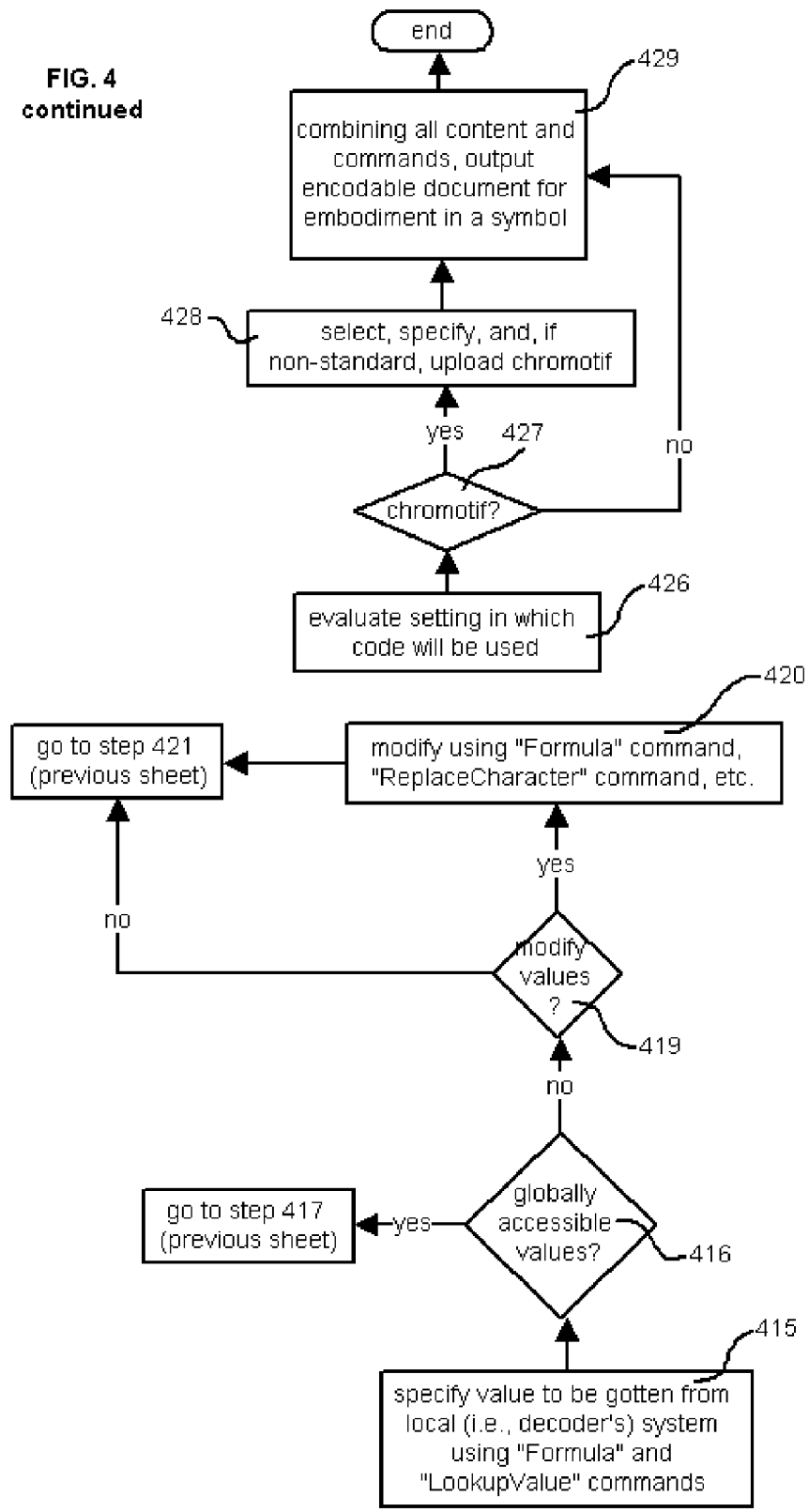
FIG. 5A is a chart depicting criteria according to which an evaluation of the appropriateness of a UHD or VHD barcode as compared to a conventional barcode may be conducted according to the present invention.
FIGS. 5B through 5F are charts depicting additional matrices of relationships between identifiers and text according to the present invention.

FIG. 8 depicts the same five words with notation of diagraphs and corresponding identifiers through which the two letters of these diagraphs can be represented by a single data blot by reference to a vocabulary such as that depicted in FIG. 5C.

In allowing modifiable multicharacter antecedents, the unique identifier essentially serves as a fulcrum in the disclosed compound matrix structure, thereby further leveraging the encoding power of the present invention so as to yield even greater information density.

4.2 External Value Acquisition through Nonlocal Referencing and Local Querying Infinitely High Density Whenever antecedents correspond to blots, an additive approach is being used: the more antecedents there are to be encoded, the more blots are needed. While the limited UHD embodiment is extremely powerful relative to the related art, information density even under the limited UHD embodiment can only be increased by increasing the amount of information assigned to each unique identifier, i.e., by developing ever more specific vocabularies and lengthier antecedents.

Figure 20A:
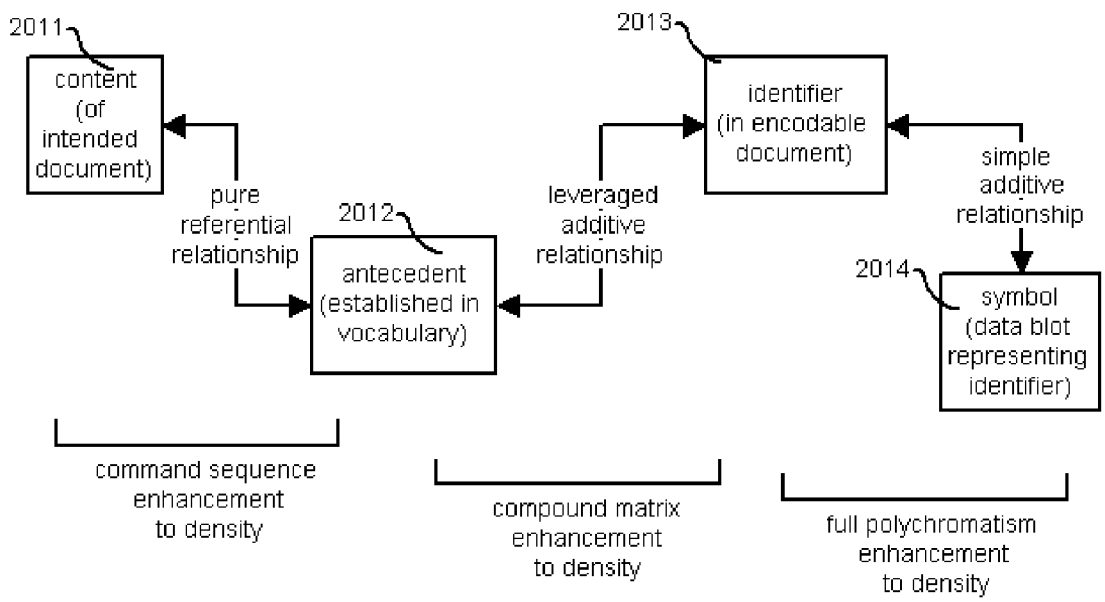
FIGS. 20A and 20B depict the symbolic relationship tiers of the present invention and the prior art, respectively.
Figure 20B:
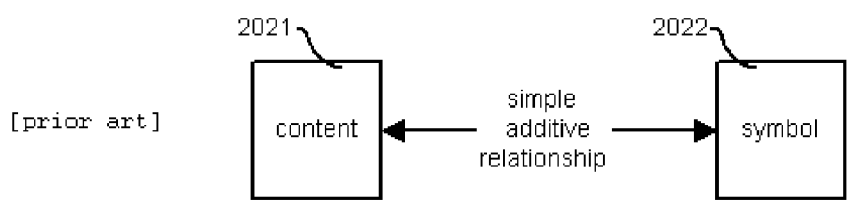

However, the inherent limitation of additive encoding—a limitation that appears to plague all the related art, both monochromatic and polychromatic, to some degree—is almost entirely bypassed through an external reference function of the present invention. This referential function may be understood in abstract terms through review of FIG. 20A, which displays the novel four-tier information relationship structure of the present invention. This structure may be compared to the prior art, which is depicted in FIG. 20B.

In practical terms, the referential function works as follows: when an external reference is used instead of additive representation of the content of an intended document, a target reference document is specified through a command sequence of antecedents such as that depicted in FIG. 11. In decoding, the target reference document is requested, typically by HTTP request, by the recipient and replicated as a defined variable, which variable is in turn processed so as to be treated as though it appeared in the chromocode as simple additive matter. FIG. 11 depicts a series of commands whereby a variable is defined by reference to a target reference document according to the present invention.

To elaborate, the command sequence itself, as depicted in FIG. 11, proceeds as follows: a "Formula" command nest encompasses antecedents presented in a sequence that conforms to a predetermined, expected syntax: (i) an identified variable, (ii) an "equals sign", and (iii) a URL that is the URL of the desired target reference document ("http://www.epoet.com/psalm" in the example). As with the remaining examples, this command sequence and the elements thereof should only serve to illustrate a type of instruction that can be performed through the present invention, not to limit the invention to a particular form of instruction.

Figure 18:
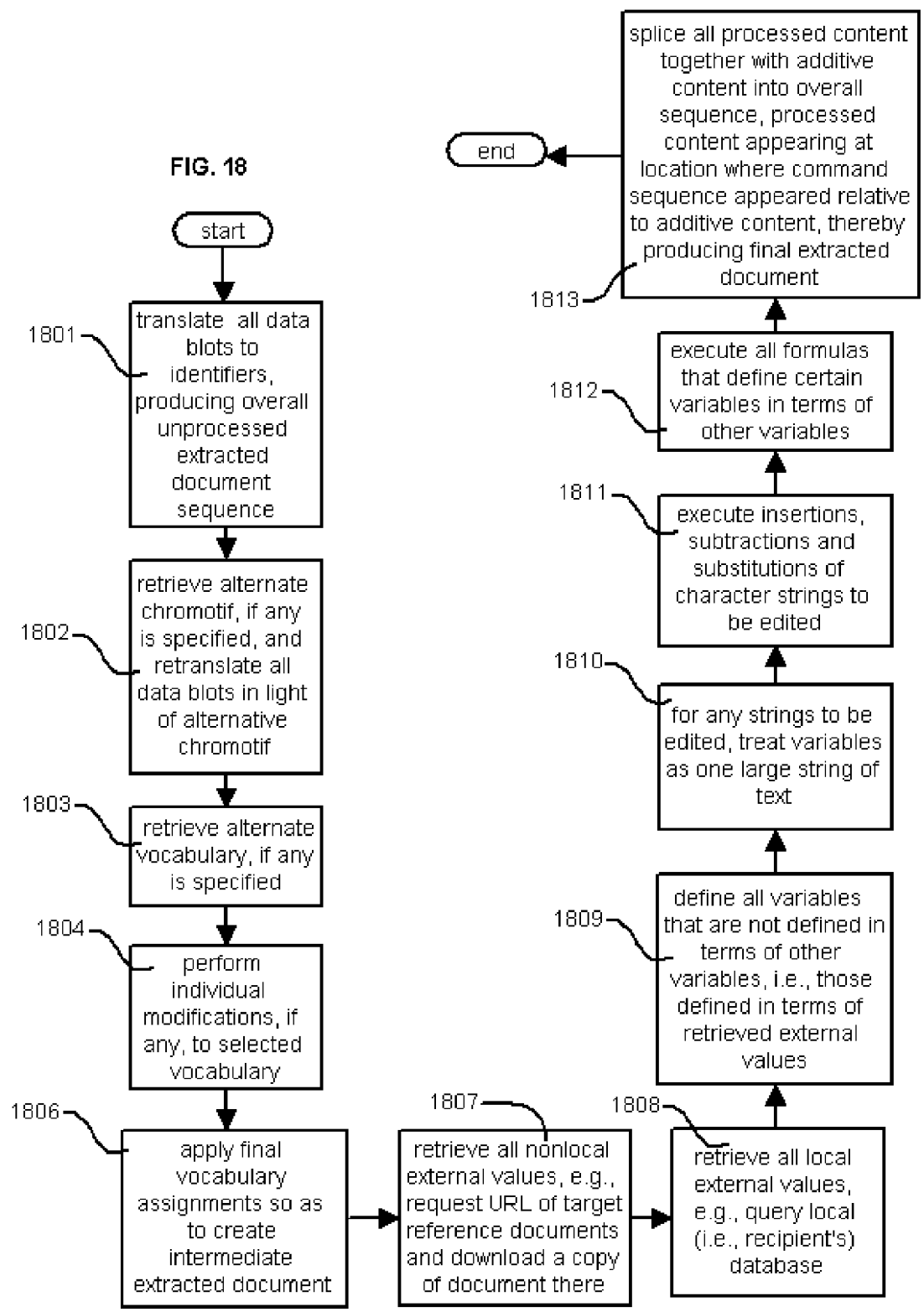
FIG. 18 is a flowchart depicting the process of acquiring and processing references and acquired content so as to yield a final extracted document according to the present invention.

As shown in the flowchart in FIG. 9D, with reference to FIG. 18, when a chromocode is decoded by a recipient, the target reference document is retrieved by requesting the file at the URL specified in the command sequence. The processed results are then included in the extracted document as though this externally-derived content were additively represented in the chromocode in the location where the relevant variable appears relative to other additive information.

The end result is a UHD-IHD code.

4.3 Subtractive, Substitutive and Insertive Processing

While the information density of the UHD-IHD code is unrivaled, the usability of the external reference feature is still constrained by the necessity of creating, uploading, hosting on an Internet-accessible server, and modifying as necessary the target reference document. However, at least one of these constraints, that of modifying the target reference document, is overcome by three external value modification functions of the present invention: subtraction/deletion, substitution, and insertion.

For instance, a sender may wish to use an external reference in order to enjoy maximum information density yet may also desire that the reference-derived content appearing in the final extracted document partly differ from the content of the target reference document itself. In such a case, a user can use the external value modification functions to modify content derived from the target reference document without modifying the target reference document itself.

FIG. 9A depicts text that has been retrieved from a target reference document, i.e., text that is an external value and has been replicated as the content of a defined variable. If the encoding party wishes for the extracted document to replace the fourth word 901 ("my") of this variable with another word ("our"), a command sequence such as that depicted in FIG. 9B is used. Specifically, the content of the variable is treated as text and the thirteenth through fourteenth characters of this variable are replaced with the characters "o", "u", and "r".

To elaborate, the command sequence itself, as depicted in FIG. 9B, proceeds as follows: a "TreatVariableAsText" command introduces the sequence; this command is expected to be immediately followed by the identifier of the variable to be modified. The characters to be replaced are immediately thereafter described through: (i) a "ReplaceCharactersBegin" command nest, within which is specified a character number ("13" in the example) that indicates the ordinal number (i.e., $13^{th}$), relative to the entire text string, of the first character to be replaced; and (ii) a "ReplaceCharactersEnd" command nest, within which is specified the ordinal number of the last character to be replaced (i.e., the $14^{th}$ character, in the example).

Immediately thereafter follows a "SubstituteCharacters" command nest, within which are provided, in desired order, a sequence of antecedents ("o", "u" and "r" in the example); when the content of the given variable is included in the final extracted document, these replacement characters are to appear in the same relative location where the deleted characters would have appeared.

Note that the example command sequence has been depicted in this way in order to demonstrate the present invention in a fashion that can be easily understood. Clearly, different and additional command names and techniques can be used as appropriate without exceeding the scope of the present disclosure.

FIG. 9C depicts the sequence segment of a chromocode 911 that symbolizes the identifiers depicted in FIG. 9B such that, when the chromocode is decoded, the instructions indicated in the command sequence represented thereby can be executed. Thus, the final extracted document appears in relevant part as shown in FIG. 9E, in which the fourth word 921 ("our") differs from the fourth word ("my") of the target reference document.

The synergistic results of the referential, subtractive, and substitutive functions when used in combination are dramatic: a 1000-page document—even one that is unique to the given chromocode—can be conveyed using a small number of color blots.

Insertive processing (not graphically shown) is similar: the character in a text string after which matter is to be inserted is identified through an "InsertAfterCharacter" command nest. Thereafter, the matter to be inserted is specified through an immediately following "Insert" command nest.

To delete characters (not graphically shown) without substituting any new characters, simply follow the command sequence for replacing characters but include no information in the "SubstituteCharacters" nest.

4.4 Comprehensive Internet Integration

Users can host vocabularies, target reference documents, chromotifs, and any other reference materials on their own websites if they wish. However, the present invention also gives rise to a commercial opportunity for a company to serve as a central location for all such hosting purposes.

Figure 12:
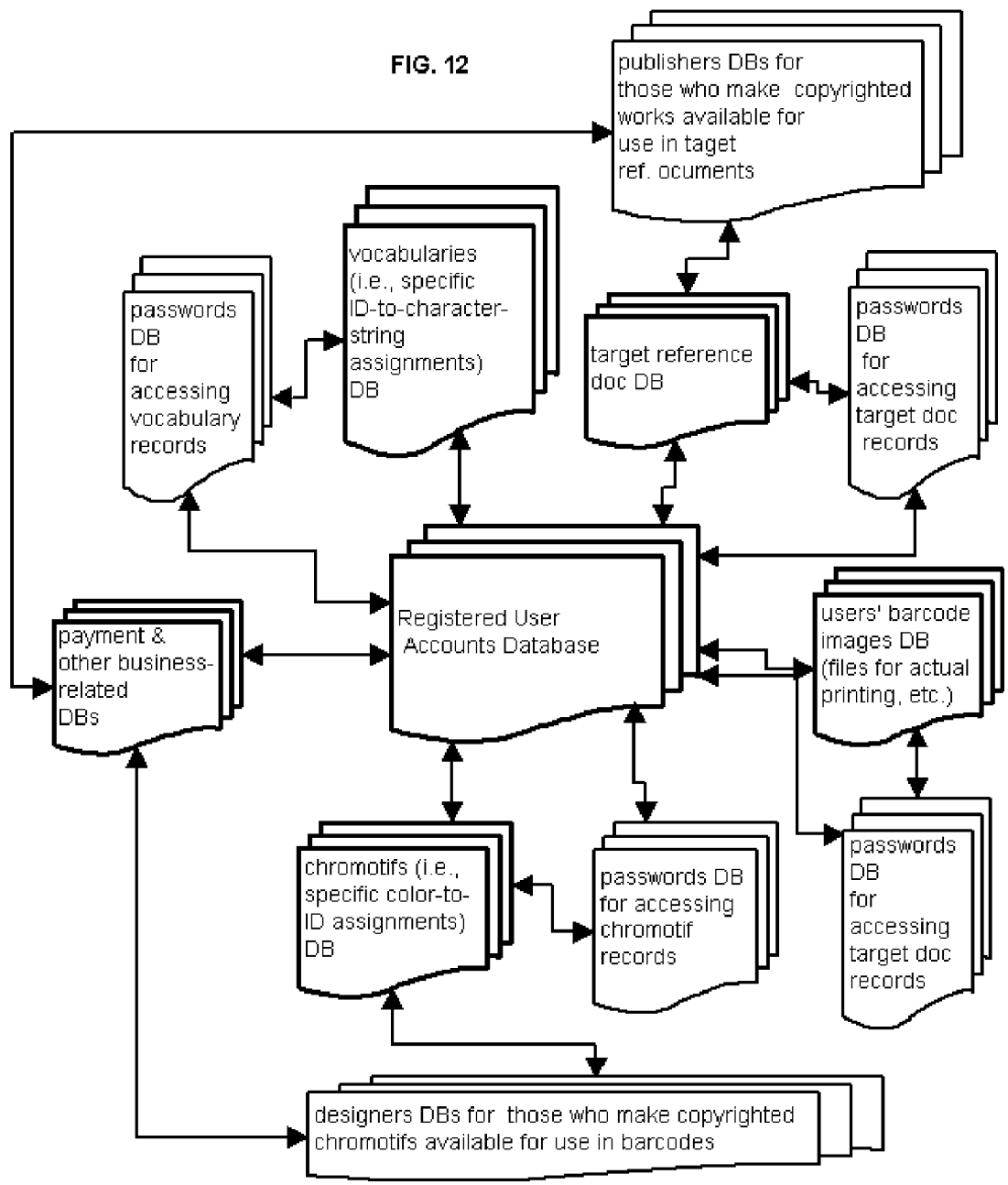
FIG. 12 depicts the primary relationships between a series of databases according to the present invention, including those which enable the password-protection function of the present invention.

FIG. 12 depicts the primary relationships between a series of relational databases which may be used by such a company. One useful feature is that of providing a password storage database related to other relevant databases so as to allow password-protection of target reference documents and other reference materials. In this way, a decoding party must first log-in to a password-protected site to gain access to a URL that is the URL of a reference. Thus, an authorized recipient can properly decode such a referential chromocode, but an unauthorized party is unable to retrieve the references that give meaning to the chromocode.

Notably, although not graphically depicted, the company may also wish to charge users a fee to host documents or to access URLs for reference materials.

Figure 13:
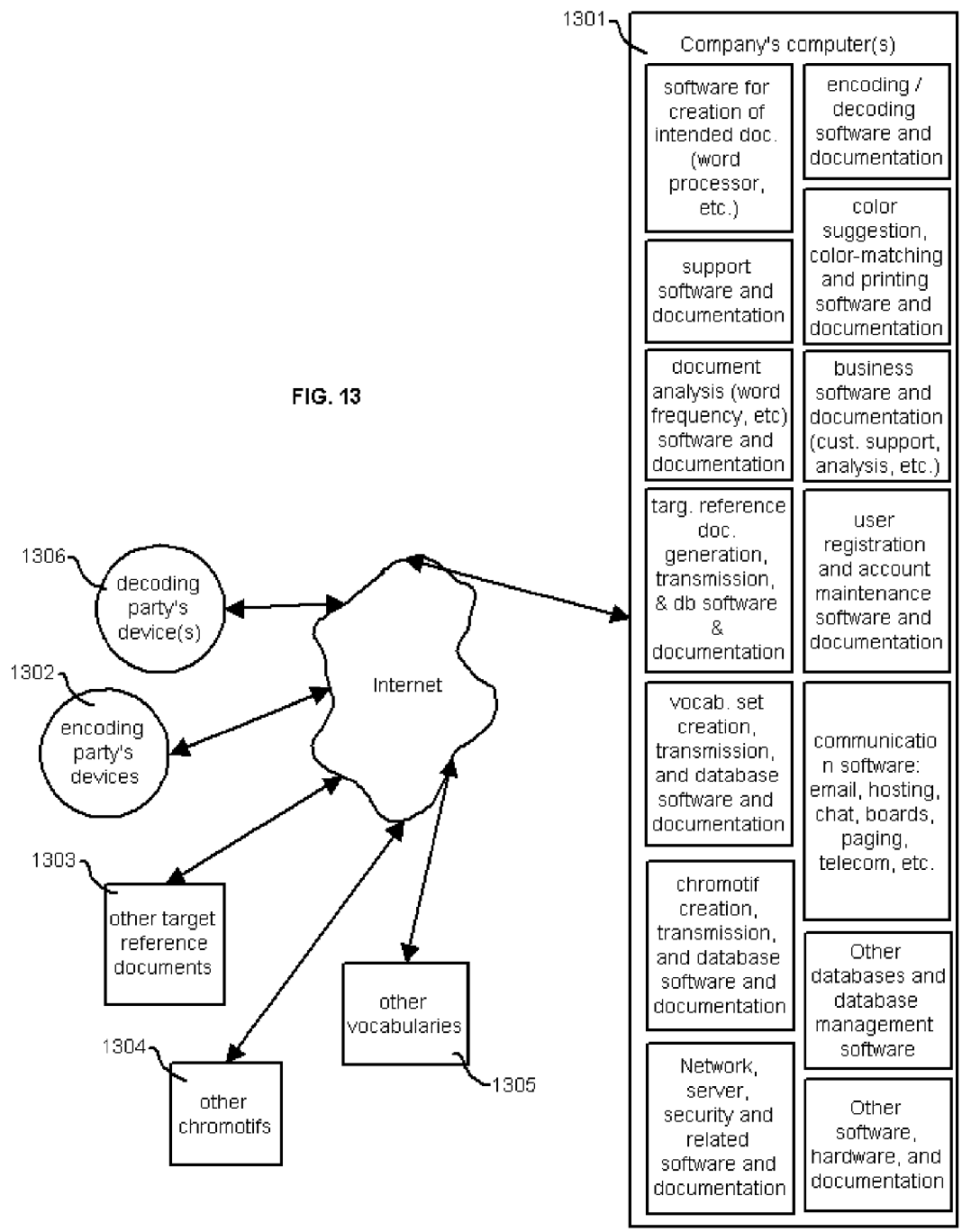
FIG. 13 depicts general system components of the present invention, including components of an apparatus used by a company.

FIG. 13 depicts the general system components of the present invention. Internet integration can be done through a company, the computers 1301 of which comprise the depicted hardware and software components. Alternately, or additionally, an encoding user 1302 can host external references on its own computers or can take advantage of target reference documents 1303, chromotif specifications 1304, and vocabularies 1305 hosted by others. A decoding user 1306 accesses the Internet for any nonlocal external values and supplies local external values through its own data-processing equipment.

FIG. 14 depicts an excerpt from an example Web submission form whereby a user submits information for storage in a database according to the present invention, such as a database comprising records of chromotifs.

5.1 Full VHD Embodiment

In applications where the higher tolerances of a VHD embodiment are desirable but a larger character set than that of the limited embodiment is needed, the full VHD embodiment may be used so that selection of the total number of colors to be used and the ratio of color blots per antecedent is possible. This selection is made with reference to the options and advantages depicted in FIG. 15D.

FIG. 15A provides a matrix of relationships between alphabetical characters and unique color blot triplets. Only three different colors are used: black, white, and red. Distinguishing between these three colors is not difficult, even under adverse conditions. Meanwhile, the use of triplets enables each letter of the entire twenty-six-letter alphabet to be represented by a unique triplet. Exactly one unique triplet is left over to serve as a "shift" character.

The shift character serves to expand the character set that can be represented by the same trichromatic color triplets. Its function is straightforward: when a non-shift-character triplet is not preceded by the shift-character triplet, the antecedent represented by the non-shift-character triplet is the default antecedent (depicted in FIG. 15A); when the non-shift-character triplet is preceded by the shift-character triplet, the antecedent represented by the non-shift-character triplet is the shifted antecedent assigned to the non-shift-character triplet in the matrix depicted in FIG. 15B.

Figure 15C:
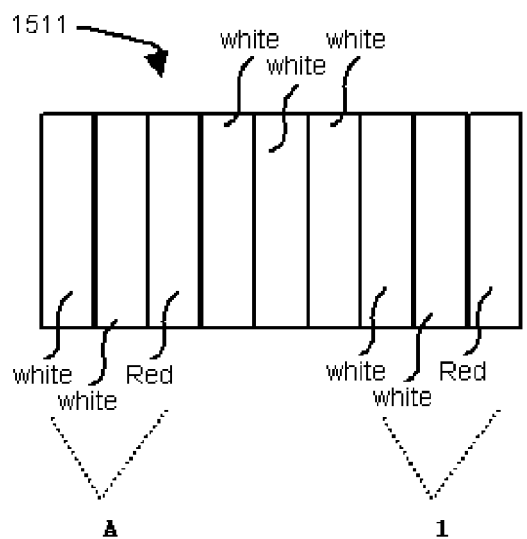
FIG. 15C depicts a barcode in which a shift triplet is used so as to enable extraction according to the shifted character set rather than the default character set according to the present invention.

An example of two different antecedents represented by the same triplet is depicted in FIG. 15C. The depicted chromocode has three triplets comprising nine data blots in total. The first triplet represents the letter "A"; the second triplet is the shift character; and the third triplet represents the numeral "1", since this triplet, identical in appearance to the first triplet, is preceded by the shift character.

FIG. 15D is a chart describing and comparing options under the VHD embodiment for use in deciding which selection is appropriate for a given application. An indication should be provided to the recipient which VHD selection has been used in encoding a particular chromocode.

Figure 16:
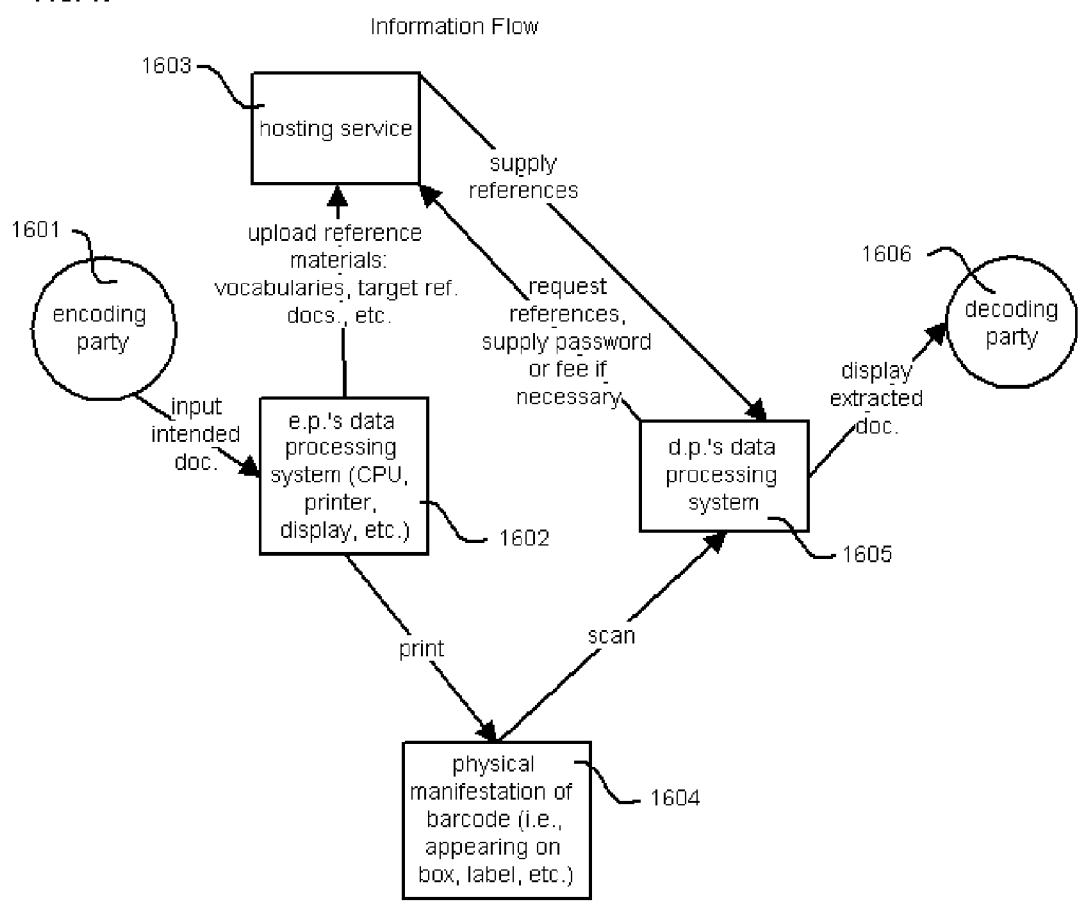
FIG. 16 is a schematic diagram depicting an exemplary information flow of the UHD embodiment of the present invention.

FIG. 16 depicts an example information flow when the UHD embodiment is used. The encoding party 1601 inputs the intended document into its data processing system 1602 for analysis and encoding. Reference materials, such as vocabularies, target reference documents, and chromotifs are uploaded to an Internet-accessible hosting service 1603, and a chromocode is printed on a surface 1604. A decoding party 1606 scans the chromocode using its data processing system 1605 and requests references from the hosting service 1603, supplying a password if necessary. The references are returned to the decoding party's data processing system 1605 for use in processing scanned data and extracting an extracted document.

Figure 17:
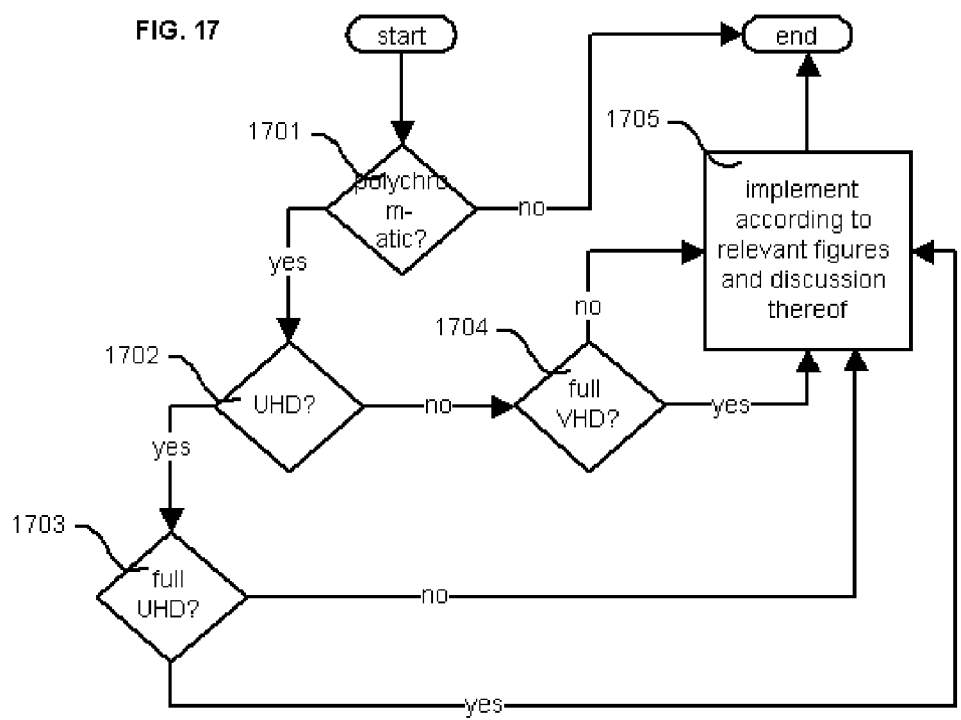
FIG. 17 is a flowchart summarizing the present invention at a high level, the steps and parts of which are illustrated in other figures.

FIG. 17 is a flow chart providing an overview of the present invention. A decision is made whether to use a polychromatic code 1701. If use of a polychromatic code is chosen, a decision is made whether to use UHD or VHD 1702. If UHD is chosen, a decision is made whether to use the full embodiment or a limited embodiment 1703. If VHD is chosen, a decision is made whether to use the full embodiment or a limited embodiment 1704. Decisions are then implemented according to relevant figures and discussions thereof 1705 as disclosed herein.

FIG. 18 is a flow chart depicting a process whereby a UHD chromocode is decoded to yield a final extracted document. First, all data blots are translated to identifiers 1801, resulting in an unprocessed extracted sequence. If an alternative chromotif or vocabulary is specified (which specification should be according to default rather than alternate matrices) all chromotifs and vocabularies are retrieved 1802 and 1803; thereafter, all remaining data blots are retranslated into identifiers in light of the alternative chromotif. Any individual modifications to the selected vocabulary through command sequences are then performed 1804. All remaining extracted identifiers are then translated to antecedents according to final vocabulary assignments 1806. Command sequences specifying nonlocal external values are then executed to acquire all content to be acquired through nonlocal external reference 1807. Command sequences specifying all local external values to be acquired are then executed 1808. All variables to represent externally acquired content are then defined 1809. If externally acquired content is to be edited, the variable to be edited is treated as a string of text 1810 and command sequences for subtraction/deletion, insertion, and substitution are executed 1811. All formulas that define certain variables in terms of other variables are then executed 1812. All processed referential content is then spliced together with additive content, with processed content appearing where the given variable antecedent representing this processed content appears relative to additive content antecedents in the unprocessed extracted sequence, so as to produce a final extracted document 1813.

It should be noted that, after a final extracted document has been produced, this extracted document can then be further manipulated as the recipient wishes. For instance, if a final extracted document is an HTML document, this document can then be viewed in a browser so that the document is presented according to the HTML formatting. Similarly, an extracted document that is an XML document can be parsed and then the data described therein imported into a database.

6.1 Scope

Although the description above contains many specificities, these should not be construed as limiting the scope of the invention but as merely providing illustrations of some of the presently preferred embodiments of this invention. Accordingly, the scope of the invention should be determined by the appended claims and their legal equivalents, rather than by the examples given. For instance, as is plain to one skilled in the art, it will be understood that features of one embodiment may be combined with features of other embodiments while other features may be omitted or replaced as being nonessential to the practice of the invention, regardless of whether such combination, omission or modification has been explicitly described.

It is expressly intended that users should supply custom and additional vocabularies, chromotifs, references, and related elaboration upon the present disclosure, and thus such matter falls clearly within the purview hereof. Additionally, the disclosed optical encoding techniques are applicable at any surface area size, and the disclosed symbolic structure may be employed through symbols that are non-optical. Thus, miniaturization of the surface area occupied by data blots or usage of the compound matrix and related structures disclosed herein in a non-optical encoding system falls clearly within the purview hereof.

Additionally, the techniques used herein can be used to create artworks of which the coloring, through custom chromotif, serves not only as art, but also as information-bearing matter.

Licensing information may be obtained through http://www.inventerprise.com.

What is claimed is:

1. An apparatus for conveying information, said apparatus being configured to perform the following steps:
    scanning a first barcode;
    comparing a first value against a second value, said first value comprising a color characteristic derived at least in part from said step of scanning said first barcode and said second value comprising a first predetermined color standard;
    determining a third value, said step of determining said third value being performed at least in part according to an outcome of said step of comparing said first value against said second value; and
    referencing a first matrix of relationships, said first matrix of relationships being selected from the group consisting of (i) a second matrix of relationships, said second matrix of relationships comprising a plurality of relationships between colors and identifiers, and (ii) a third matrix of relationships, said third matrix of relationships comprising a plurality of relationships between identifiers and antecedents.

2. The method in claim 1 wherein a valid password is required.

3. The method in claim 1 wherein a fee is required.

4. The apparatus in claim 1 additionally configured to perform the following step:
    sending or receiving a first fee submission or a first password.

5. The apparatus in claim 1 additionally configured to perform the following steps:
    analyzing a first document; and
    selecting a first vocabulary, said step of selecting a first vocabulary being based at least in part on an outcome of said step of analyzing a first document.

6. The apparatus in claim 1 additionally configured to perform the following step:
    decoding a command sequence, said first barcode comprising said command sequence.

7. The apparatus in claim 1 additionally configured to perform the following step:
    requesting a first resource, said first resource being located at a first URL, said first barcode comprising said first URL.

8. A system for use in communicating information, said system being configured to perform the following steps:
    receiving a first submission, said first submission being selected from the group consisting of (i) a password and (ii) a payment; receiving a first request, said first request pertaining to a first resource, said first resource being located at a first URL; providing a first value, said first resource comprising said first value, said first value being suitable for use in ascertaining at least in part the meaning of a first barcode, wherein: said step of providing said first value is performed only when said first submission comprises at least one of a valid password or a sufficient payment;
    establishing a first account, said first account relating to a first user; and
    receiving a second submission, said second submission comprising a first assignment, said first assignment being selected from the group consisting of (i) a second assignment, said second assignment assigning a first color to a second value, and (ii) a third assignment, said third assignment assigning a third value to a first word, phrase or character combination.

9. The system in claim 8 wherein said first value is based at least in part on said second submission.

10. The apparatus in claim 1 wherein said first barcode comprises a first calibration portion, said first calibration portion being a part of said first barcode that is suitable for use in calibration of a first scanning device.

11. The apparatus in claim 1 wherein said first barcode is selected from the group consisting of (i) a six-color, two-blot code, (ii) a three-color, three-blot code, (iii) a five-color, two-blot code, and (iv) a four-color, three-blot code.

* * * * *